US012193412B2

(12) United States Patent
Ryan et al.

(10) Patent No.: US 12,193,412 B2
(45) Date of Patent: Jan. 14, 2025

(54) ANIMAL WEARABLE TRACKER DEVICE AND RELATED METHODS

(71) Applicant: Smart Tracking Technologies, LLC, Jacksonville, FL (US)

(72) Inventors: Colby Ryan, Richardson, TX (US); Brent Duncan, Richardson, TX (US); Donny C. Lamey, Jr., Jacksonville, FL (US); Joseph T. McKee, Stamford, CT (US); Paulina Mosley, Richardson, TX (US); Eugene Van Beljon, Grapevine, TX (US)

(73) Assignee: SMART TRACKING TECHNOLOGIES, LLC, Jacksonville, FL (US)

( * ) Notice: Subject to any disclaimer, the term of this patent is extended or adjusted under 35 U.S.C. 154(b) by 381 days.

(21) Appl. No.: 17/809,576

(22) Filed: Jun. 29, 2022

(65) Prior Publication Data
US 2022/0322640 A1   Oct. 13, 2022

Related U.S. Application Data

(60) Continuation-in-part of application No. 17/140,338, filed on Jan. 4, 2021, now Pat. No. 11,910,783, which
(Continued)

(51) Int. Cl.
*A01K 27/00* (2006.01)
*A01K 11/00* (2006.01)
(Continued)

(52) U.S. Cl.
CPC .......... *A01K 27/009* (2013.01); *A01K 11/008* (2013.01); *H04W 4/023* (2013.01);
(Continued)

(58) Field of Classification Search
CPC . H04W 4/023; H04W 52/0251; H04W 88/04; A01K 27/009; A01K 11/008;
(Continued)

(56) References Cited

U.S. PATENT DOCUMENTS

| 6,674,406 B1 * | 1/2004 | Tonn | H01Q 9/0442 343/770 |
| 9,693,536 B1 | 7/2017 | Dana | |

(Continued)

*Primary Examiner* — Dominic E Rego
(74) *Attorney, Agent, or Firm* — Allen, Dyer, Doppelt + Gilchrist, PA

(57) ABSTRACT

An animal collar device may include a circuit board, a sensing component carried by the circuit board and configured to collect data about an animal, a first elongate patch antenna carried by the circuit board and having a first longitudinal side and a second longitudinal side opposing the first longitudinal side, and a first end and a second end opposing the first end. The first and second ends are between the first and second longitudinal sides. The second longitudinal side may include a slots. The animal collar device may include a processor carried by the circuit board and coupled to the sensing component and the first elongate patch antenna, the processor configured to communicate the data about the animal to a base station and a mobile device.

20 Claims, 28 Drawing Sheets

Related U.S. Application Data is a division of application No. 15/258,635, filed on Sep. 7, 2016, now Pat. No. 10,912,282.

(60) Provisional application No. 63/202,943, filed on Jun. 30, 2021.

(51) Int. Cl.
*H04W 4/02* (2018.01)
*H04W 52/02* (2009.01)
*H04W 88/04* (2009.01)

(52) U.S. Cl.
CPC ........ H04W 52/0251 (2013.01); *H04W 88/04* (2013.01); *Y02D 30/70* (2020.08)

(58) Field of Classification Search
CPC .. A01K 15/021; A01K 27/001; A01K 29/005; Y02D 30/70
See application file for complete search history.

(56) References Cited

U.S. PATENT DOCUMENTS

| | | | | |
|---|---|---|---|---|
| 10,912,282 | B2* | 2/2021 | McKee | A01K 11/008 |
| 2004/0100405 | A1* | 5/2004 | Mohamadi | H01Q 21/065 343/700 MS |
| 2009/0073065 | A1* | 3/2009 | Jordan | H01Q 13/106 343/767 |
| 2010/0026594 | A1* | 2/2010 | Yang | H01Q 13/08 343/702 |
| 2010/0249769 | A1* | 9/2010 | Nau, Jr. | A61B 18/1815 606/33 |
| 2013/0157628 | A1* | 6/2013 | Kim | A01K 15/04 455/414.1 |
| 2013/0328641 | A1* | 12/2013 | Komori | H01P 3/12 333/248 |
| 2014/0230755 | A1* | 8/2014 | Trenkle | A01K 27/009 340/573.3 |
| 2014/0232541 | A1* | 8/2014 | Trenkle | G08B 25/10 340/539.13 |
| 2015/0122199 | A1* | 5/2015 | Koplin | A01K 15/021 119/718 |
| 2015/0288269 | A1* | 10/2015 | Ruff | H02K 35/04 310/36 |
| 2016/0135431 | A1* | 5/2016 | Sheldon | A01K 27/009 119/859 |
| 2016/0268688 | A1* | 9/2016 | McKay | H01Q 1/12 |
| 2016/0365639 | A1* | 12/2016 | Huang | H01Q 9/18 |
| 2017/0280688 | A1* | 10/2017 | Deliou | A01K 11/008 |
| 2018/0271066 | A1 | 9/2018 | Balbian et al. | |
| 2019/0260110 | A1 | 8/2019 | Thai et al. | |
| 2021/0120787 | A1 | 4/2021 | McKee et al. | |

* cited by examiner

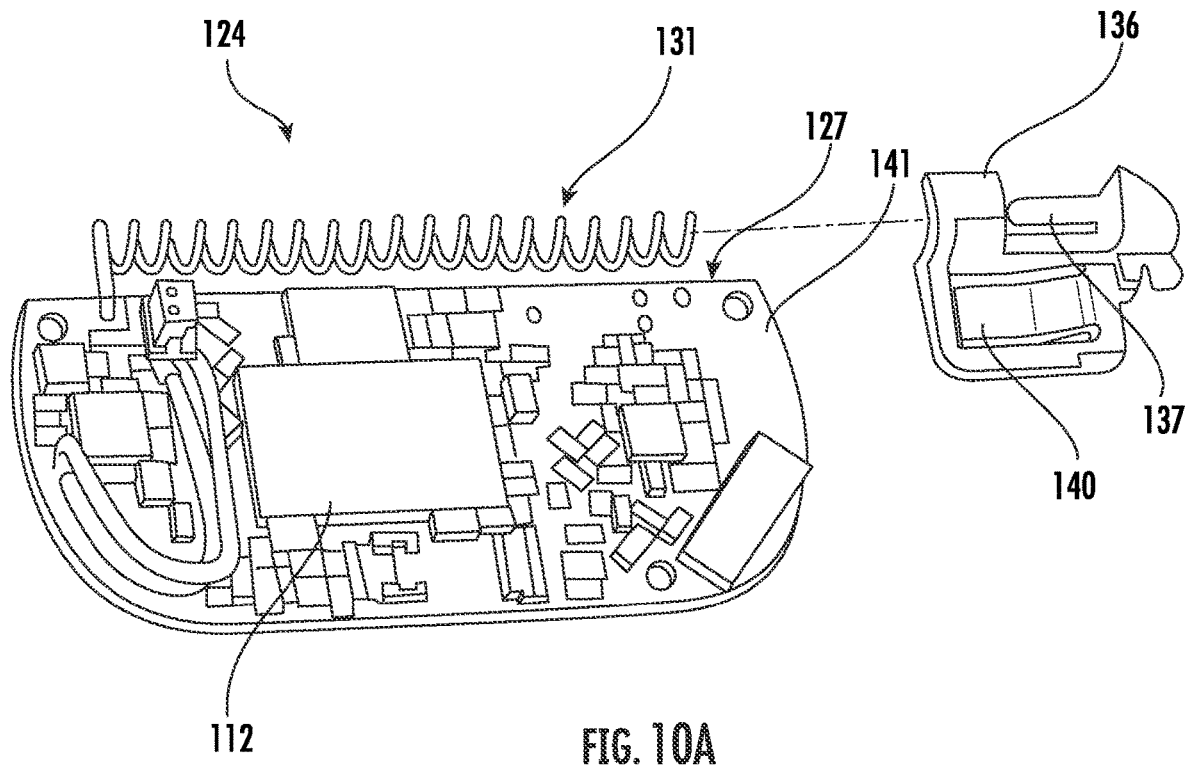
FIG. 10A
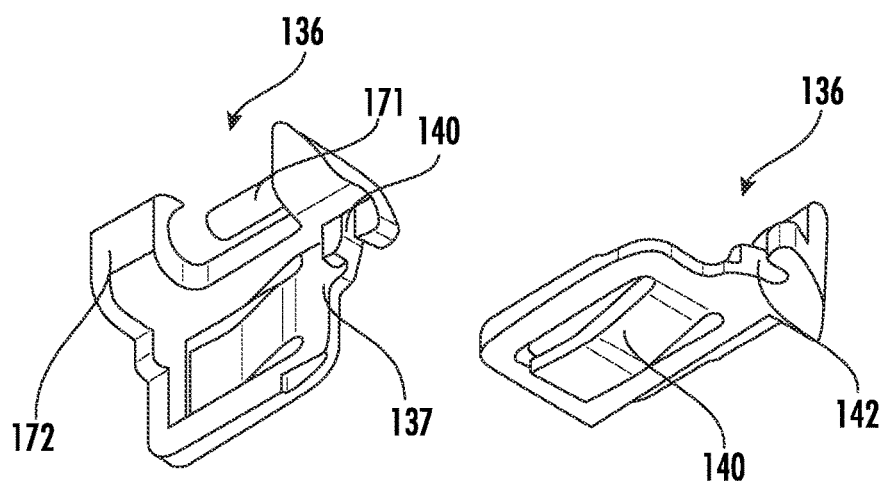
FIG. 10B
FIG. 10C

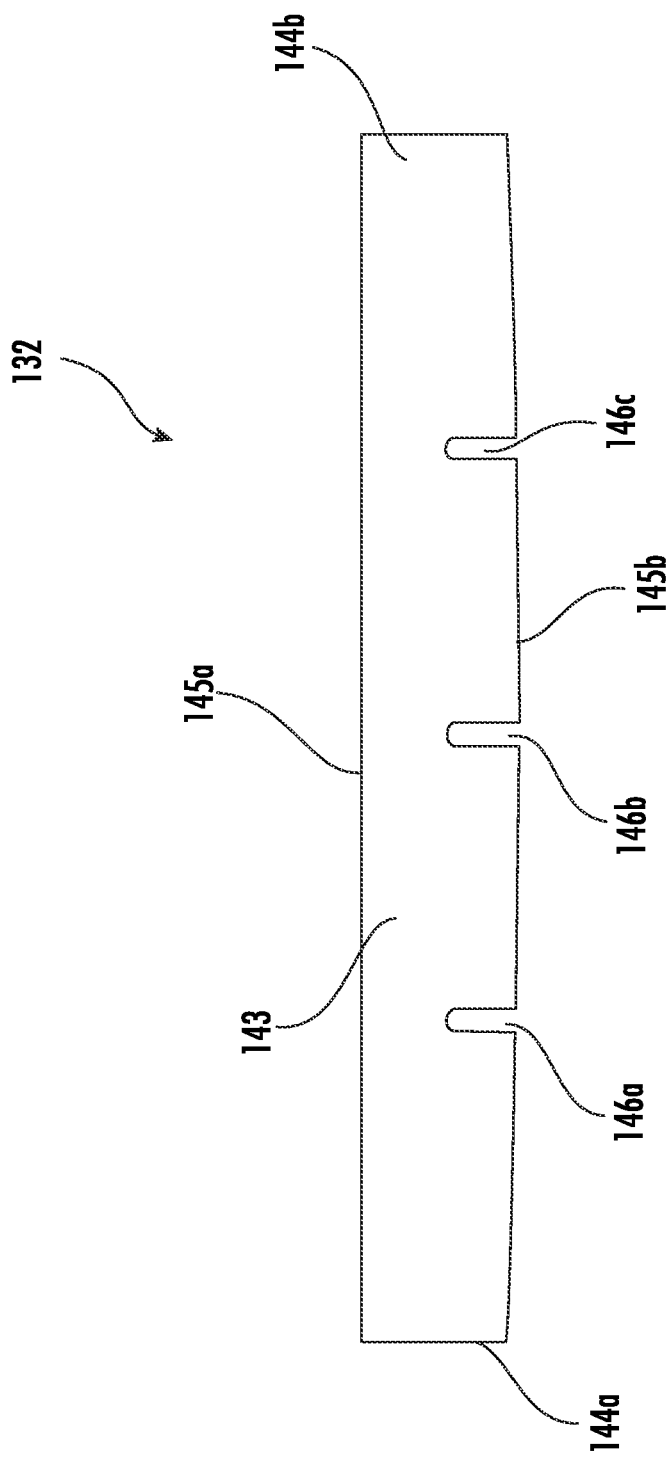

ANIMAL WEARABLE TRACKER DEVICE AND RELATED METHODS

RELATED APPLICATION

The present application is claims priority to provisional application Ser. No. 63/202,943 filed Jun. 30, 2021, and is a continuation-in-part application of copending patent application Ser. No. 17/140,338 filed Jan. 4, 2021, which is a divisional of application Ser. No. 15/258,635 filed Sep. 7, 2016, now U.S. Pat. No. 10,912,282, the contents of these are hereby incorporated by reference in their entirety.

TECHNICAL FIELD

The present disclosure relates to the field of wearable tracker devices, and, more particularly, to an animal wearable tracker device and related methods.

BACKGROUND

A number of wearable electronics have been designed for humans. Many of these "wearables" are focused on health and wellness. These fitness wearables are typically in the form of a bracelet and are designed to collect information from the user. These fitness wearables monitor the activity and heart rate of the user using a gyroscope and/or heart rate sensor and transmit that data to the user.

Other wearables are focused on connectivity. These wearables are typically in the form of a "smartwatch" and are designed to present information from the user's smartphone to the user. These smartwatches receive notifications from the user's smartphone via Bluetooth or from a server via Wi-Fi, alert the user with a sound or vibration and then present that notification visually on a screen.

Still other wearables provide a measure of interactivity. For example, many of the more feature-packed smartwatches allow the user to answer phone calls using a built-in microphone and speaker. In another example, many of the more feature-packed smartwatches allow the user to input information using their voice, hand gestures, a stylus or mechanical components on the watch. Many of these feature-packed smartwatches also incorporate the fitness components of provided by fitness wearables.

SUMMARY

Generally, an animal collar system is for monitoring an animal. The animal collar system may include a mobile device associated with a user, a base station, and an animal collar device. The animal collar device may comprise a circuit board, at least one sensing component carried by the circuit board and configured to collect data about the animal, a first elongate patch antenna carried by the circuit board and comprising a first longitudinal side and a second longitudinal side opposing the first longitudinal side, and a first end and a second end opposing the first end, the first and second ends being between the first and second longitudinal sides. The second longitudinal side may include a plurality of slots. The animal collar device may include a processor carried by the circuit board and coupled to the at least one sensing component and the first elongate patch antenna, the processor is configured to communicate the data about the animal to the base station and the mobile device.

In some embodiments, the first elongate patch antenna may have a non-planar shape. The first end and the second end may each comprise a curved end. The animal collar device may comprise a second coil antenna carried by the circuit board and coupled to the processor. The second coil antenna may comprise an elongate coil segment, and a feed arm coupled between the elongate coil segment and the processor. The second coil antenna may comprise a mount comprising a retention arm coupled to the circuit board, and an inner antenna arm extending from the retention arm and within the elongate coil segment.

More specifically, the mount may comprise an outer arm extending from the retention arm and radially around the elongate coil segment. The mount may comprise a dielectric material. The animal collar device may comprise a housing carrying the circuit board, the at least one sensing component, the first elongate patch antenna, and the processor. Each of the plurality of slots may comprise substantially parallel sides, and a curved end extending into the substantially parallel sides.

Another aspect is directed to an animal collar device for monitoring an animal and in communication with a mobile device associated with a user and a base station. The animal collar device may include a circuit board, at least one sensing component carried by the circuit board and configured to collect data about the animal, and a first elongate patch antenna carried by the circuit board. The first elongate patch antenna may comprise a first longitudinal side and a second longitudinal side opposing the first longitudinal side, and a first end and a second end opposing the first end, the first and second ends being between the first and second longitudinal sides, the second longitudinal side comprising a plurality of slots. The animal collar device may include a processor carried by the circuit board and coupled to the at least one sensing component and the first elongate patch antenna, the processor configured to communicate the data about the animal to the base station and the mobile device.

Another aspect is directed to a method for operating an animal collar device monitoring an animal. The animal collar device is in communication with a mobile device associated with a user and a base station. The animal collar device comprises at least one sensing component to be carried by a circuit board and configured to collect data about the animal, and a first elongate patch antenna to be carried by the circuit board. The first elongate patch antenna comprises a first longitudinal side and a second longitudinal side opposing the first longitudinal side, and a first end and a second end opposing the first end. The first and second ends are between the first and second longitudinal sides, and the second longitudinal side comprises a plurality of slots. The method comprises operating a processor to be carried by the circuit board and to be coupled to the at least one sensing component and the first elongate patch antenna, the processor configured to communicate the data about the animal to the base station and the mobile device.

Yet another aspect is directed to a method for making an animal collar device for monitoring an animal and in communication with a mobile device associated with a user and a base station. The method may include coupling at least one sensing component to be carried by a circuit board and configured to collect data about the animal, and coupling a first elongate patch antenna to be carried by the circuit board and comprising a first longitudinal side and a second longitudinal side opposing the first longitudinal side, and a first end and a second end opposing the first end. The first and second ends may be between the first and second longitudinal sides, and the second longitudinal side may comprise a plurality of slots. The method may include coupling a processor to be carried by the circuit board and to be coupled to the at least one sensing component and the first elongate patch antenna, the processor configured to communicate the data about the animal to the base station and the mobile device.

BRIEF DESCRIPTION OF THE DRAWINGS

FIG. 10A is a schematic exploded view of the tracker device from the animal collar device in the animal collar system of FIG. 1.

FIGS. 10B and 10C are schematic perspective views of the antenna mount from the animal collar device in the animal collar system of FIG. 1.

FIG. 12 is a schematic top plan view of the second patch antenna from the animal collar device in the animal collar system of FIG. 1.

DETAILED DESCRIPTION

Figure 1:
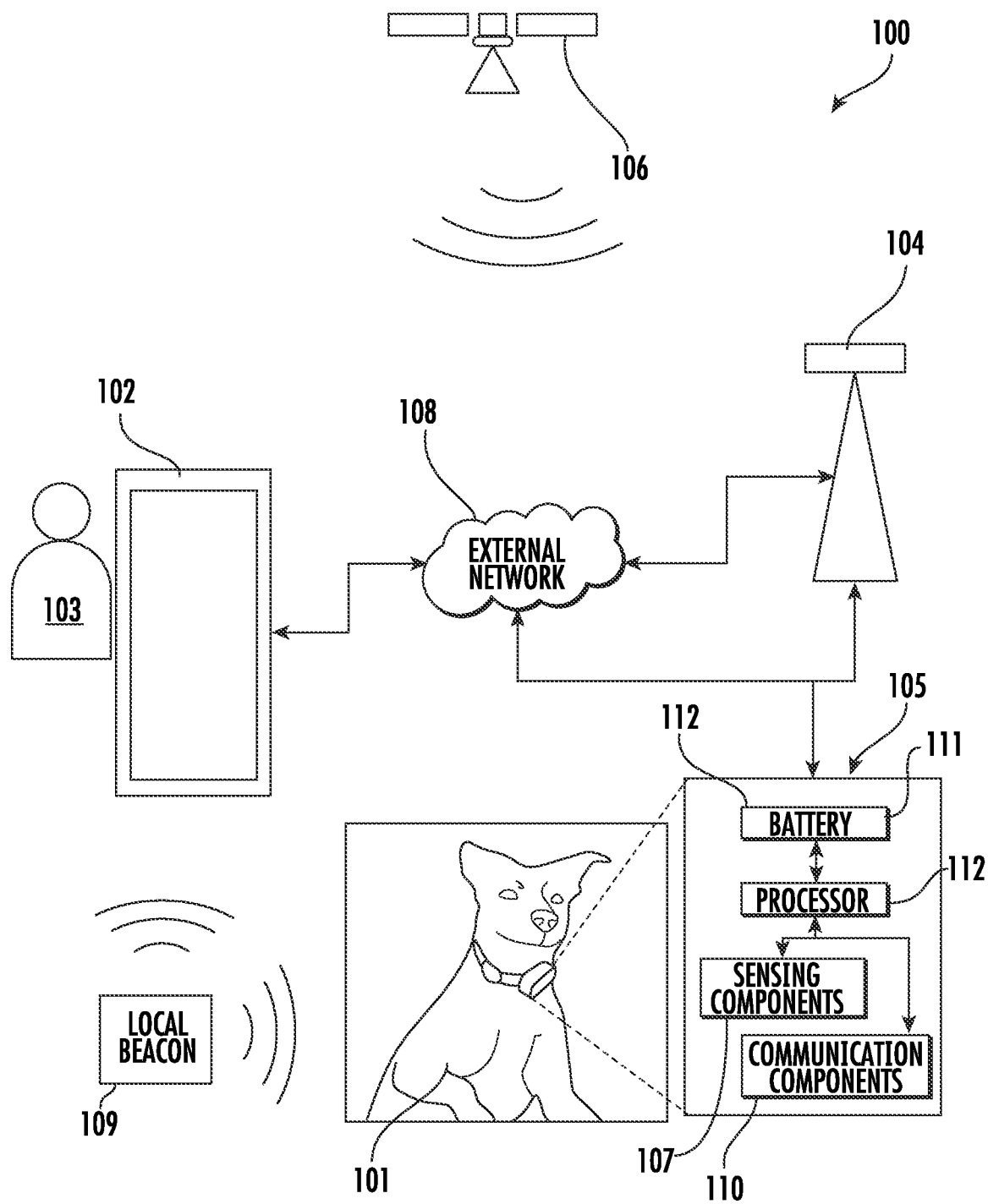
FIG. 1 is a schematic diagram of an animal collar system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, an animal collar system 100, according to the present disclosure, for monitoring an animal 101 is now described. The animal collar system 100 illustratively includes a mobile device 102 (e.g. a smart phone device, a tablet computing device, a desktop computing device) associated with a user 103, a base station 104, and an animal collar device 105 in communication with the mobile device and the base station. The animal collar device 105 may also be in communication with a satellite 106 to provide a geolocation value. For example, the satellite 106 may be part of a global positioning system (GPS).

The animal collar device 105 illustratively comprises a plurality of monitoring/sensing components 107 configured to collect data about the animal 101. For example, the plurality of sensing components 107 may comprise one or more of a heart rate sensor, a body temperature sensor, and a gyroscope sensor. The animal collar device 105 illustratively comprises a plurality of communication components 110 configured to communicate the data about the animal 101 to the base station 104 and the mobile device 102. The plurality of communication components 110 may comprise one or more of an antenna, a wireless transceiver, and a wireless encoder/decoder circuit.

The animal collar device 105 illustratively comprises a battery 111 coupled to the plurality of sensing components 107 and the plurality of communication components 110. The animal collar device 105 illustratively comprises a processor 112 coupled to the battery 111. The processor 112 may comprise an integrated circuit (IC) processor, an application specific integrated circuit (ASIC), or a low power general purpose computing platform (e.g. Arduino).

The processor 112 is configured to determine whether the plurality of communication components 110 is connected to one or more of the base station 104 and the mobile device 102 to provide a location of the animal 101 relative to the base station and the mobile device. The processor 112 is also configured to cause the plurality of communication components 110 to transmit the data about the animal 101 via an external network 108 (e.g. the Internet).

Figure 2A:
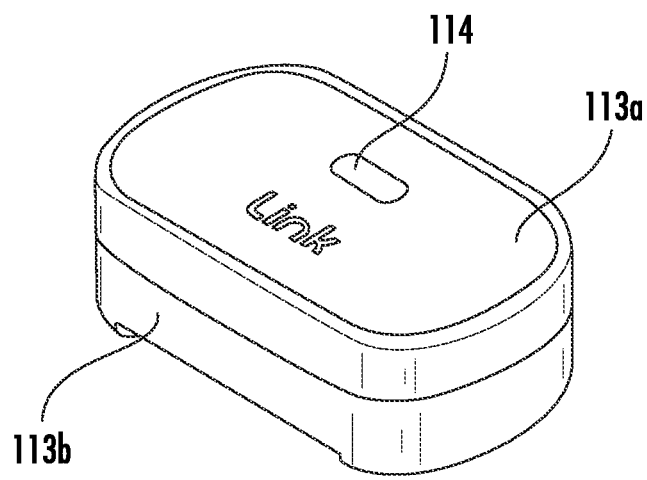
FIGS. 2A and 2B are schematic perspective views of the first and second housing sections from the animal collar device in the animal collar system of FIG. 1.
Figure 2B:
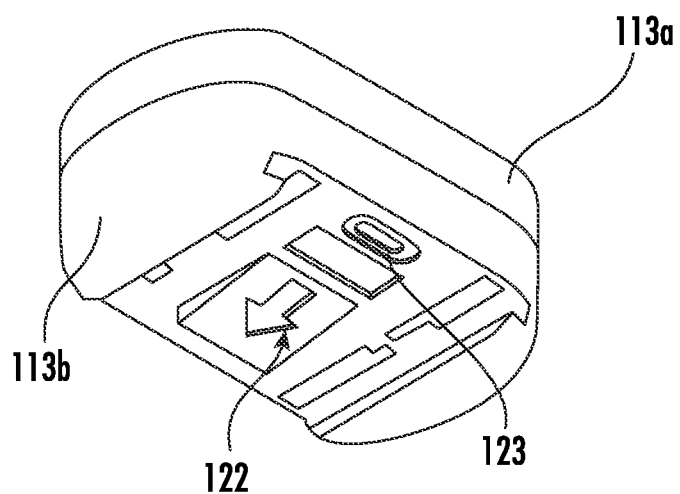
Figure 2C:
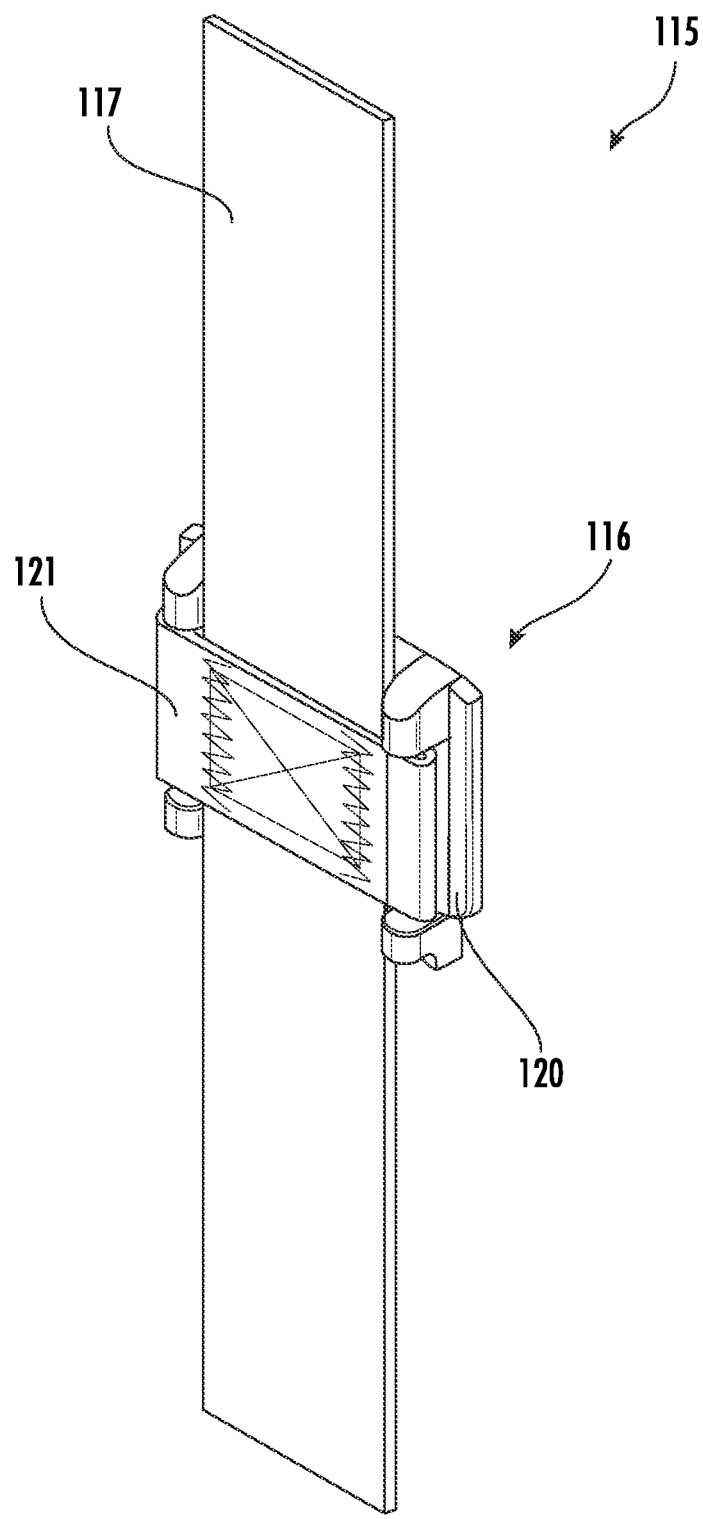
FIG. 2C is a schematic perspective view of a first example embodiment of the collar assembly from the animal collar device in the animal collar system of FIG. 1.
Figure 3:
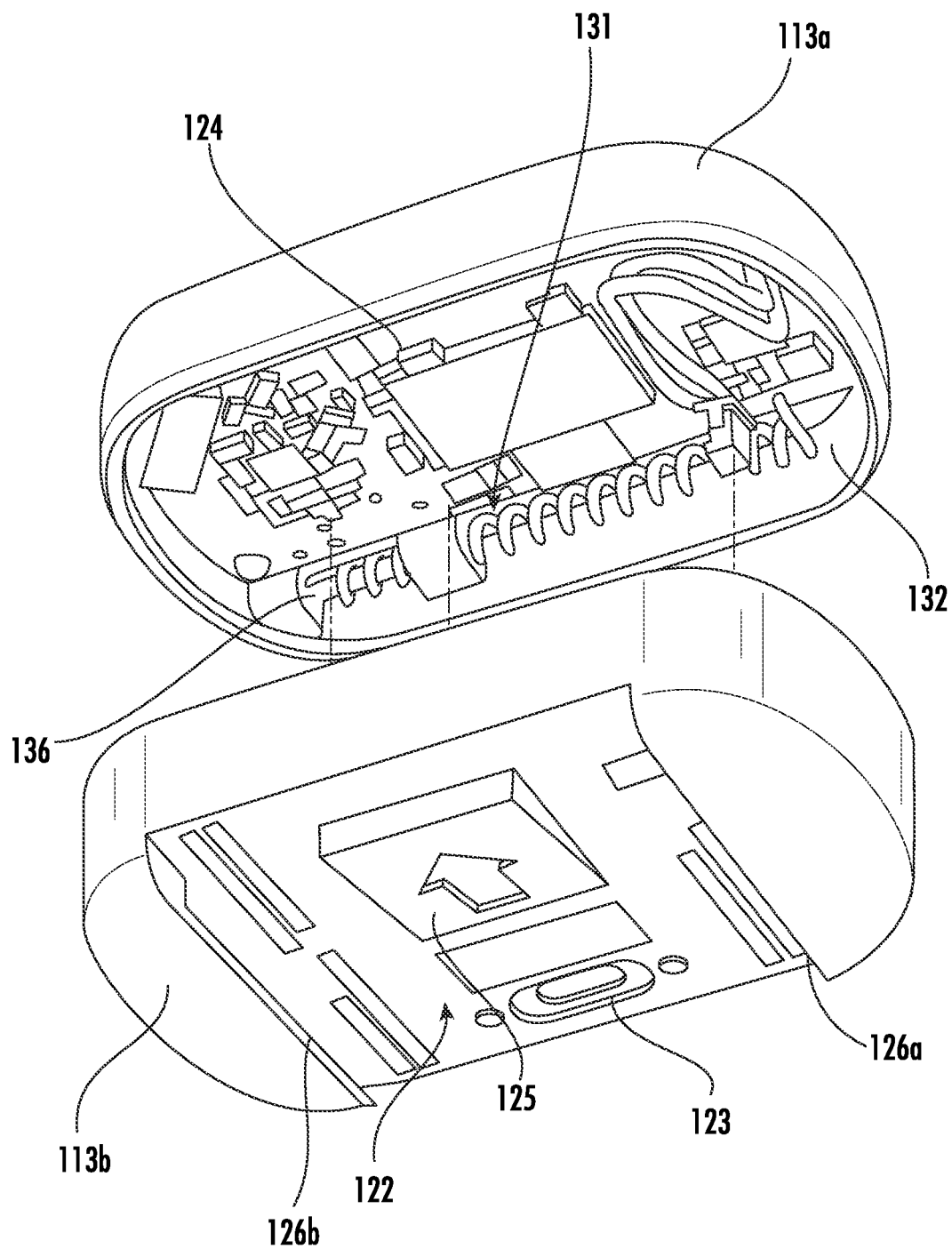
FIG. 3 is a schematic perspective view of the first and second housing sections with the tracker device from the animal collar device in the animal collar system of FIG. 1.
Figure 4:
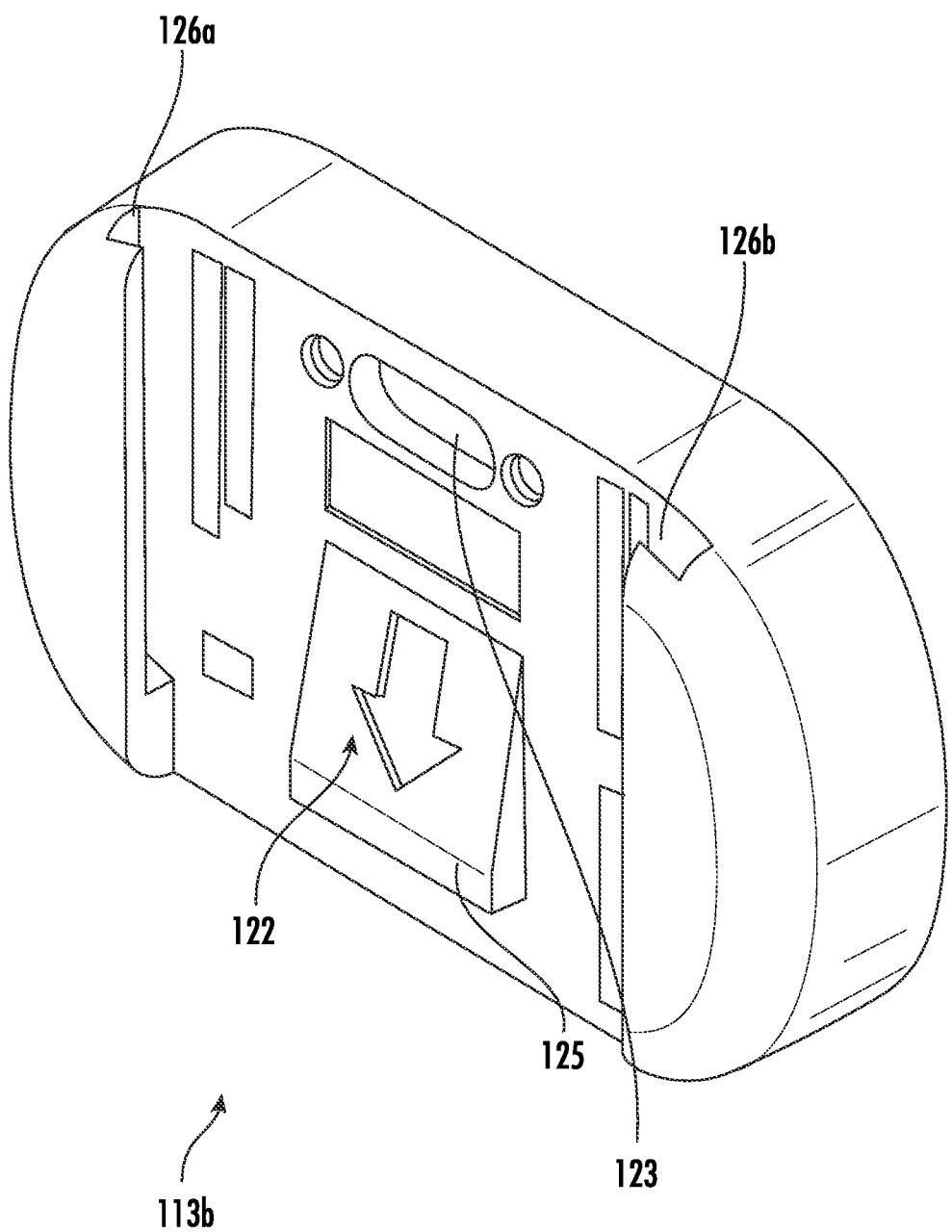
FIG. 4 is a schematic perspective view of the second housing section from the animal collar device in the animal collar system of FIG. 1.
Figure 5:
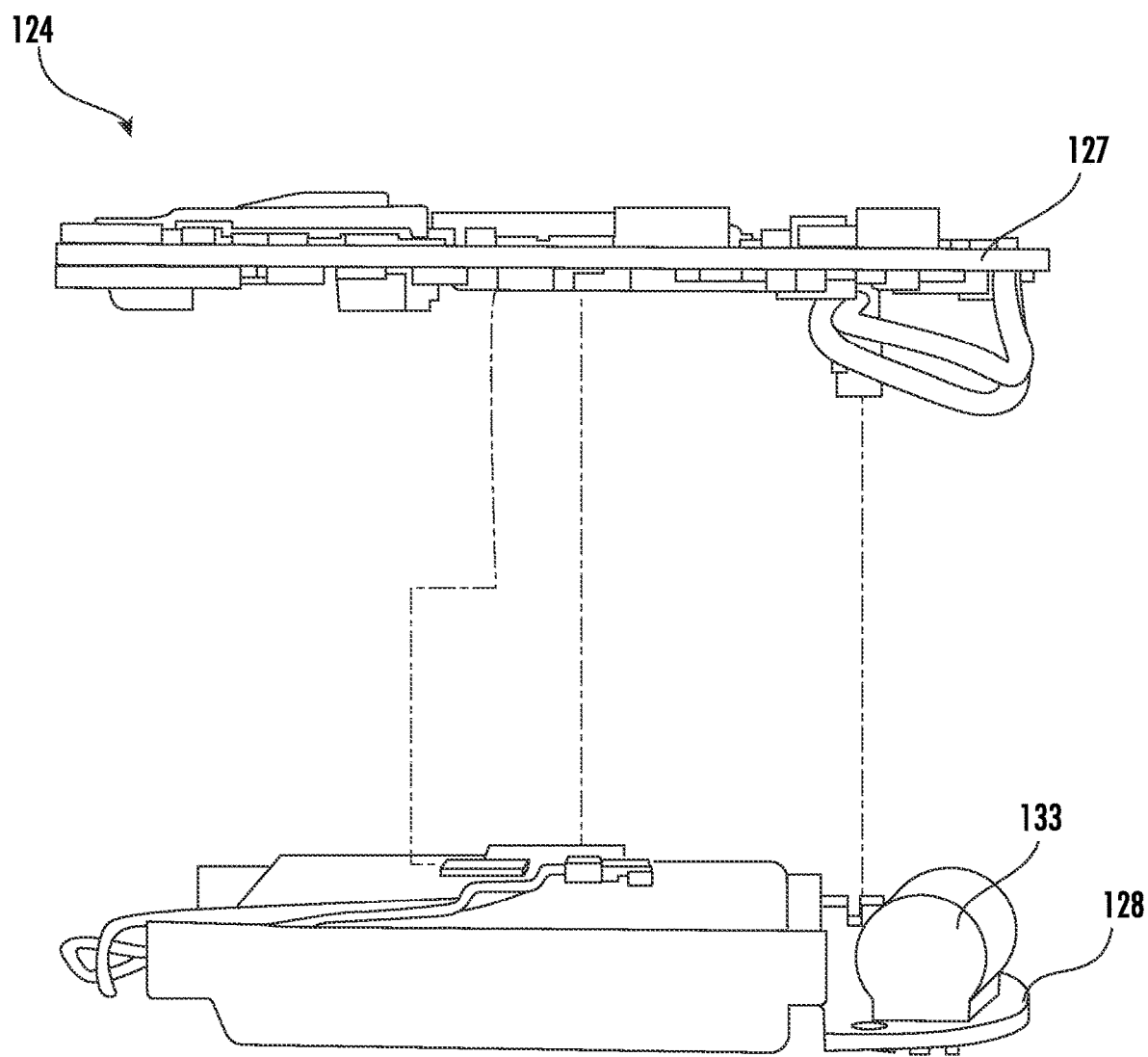
FIG. 5 is a schematic exploded view of the tracker device from the animal collar device in the animal collar system of FIG. 1.

Referring now additionally to FIGS. 2A-2C, the animal collar device 105 illustratively includes a first housing section 113a, and a second housing section 113b coupled to the first housing section 113a. The first and second housing sections 113a-113b may comprise a dielectric material, for example, a polymer plastic material. The coupling may be accomplished by an ultrasonic welding, an adhesive material, or a mechanical interface lock, for example. The first housing section 113a comprises a visual indicator opening 114. The animal collar device 105 illustratively comprises a collar assembly 115 coupled to the second housing section 113b.

The collar assembly 115 comprises a retainer device 116, and a strap 117 extending through the retainer device and to wrap around the animal 101. The retainer device 116 comprises a base 120 coupling to the second housing section 113b and a retention arm 121 defining a slot to receive and retain the strap 117. The second housing section 113b illustratively includes an interface 122 for coupling to the base 120, and a charging port opening 123. The interface 122 comprises a ramp 125, and first and second opposing slots 126a-126b receiving the retainer device 116.

Referring now additionally to FIGS. 3-9, the animal collar device 105 illustratively includes a tracker circuit 124 carried by the first housing section 113a. The tracker circuit 124 comprises a circuit board 127 (e.g. a dielectric printed circuit board), a battery 111 carried by the circuit board, a processor 112 carried by the circuit board and coupled to the battery, a first coil antenna 131 carried by the circuit board and coupled to the processor, a second patch antenna 132 carried by the circuit board and coupled to the processor, an additional circuit board 128 (e.g. dielectric printed circuit board), and a haptic feedback motor 133 carried by the additional circuit board and coupled to the processor.

Referring now to FIGS. 10A-11B, the first coil antenna 131 illustratively includes an elongate coil segment 134, and a feed arm 135 coupled between the elongate coil segment and the processor 112. As will be appreciated, the first coil antenna 131 may comprise a geolocation receive antenna, for example, configured to receive signals from the GPS system.

The first coil antenna 131 also includes an antenna mount 136 coupled to the first housing section 113a. The antenna mount 136 may comprise a dielectric material, such as a plastic polymer material. The antenna mount 136 illustratively includes a cylindrical arm 137 extending within a distal portion of the elongate coil segment 134 opposite the feed arm 135. The antenna mount 136 also includes a clip interface 140 to engage a peripheral portion 141 of the circuit board 127.

Figure 11A:
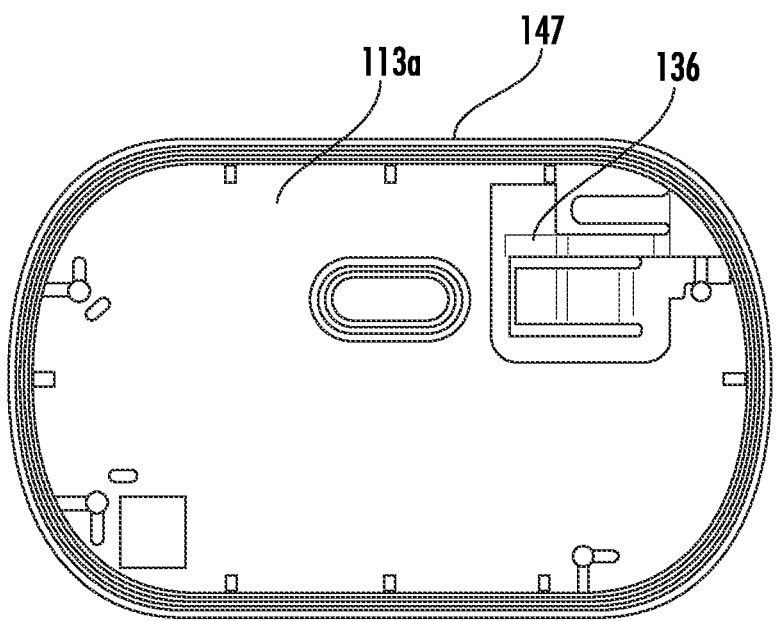
FIGS. 11A and 11B are a schematic top plan view and an enlarged schematic top plan view, respectively, of the antenna mount from the animal collar device in the animal collar system of FIG. 1.
Figure 11B:
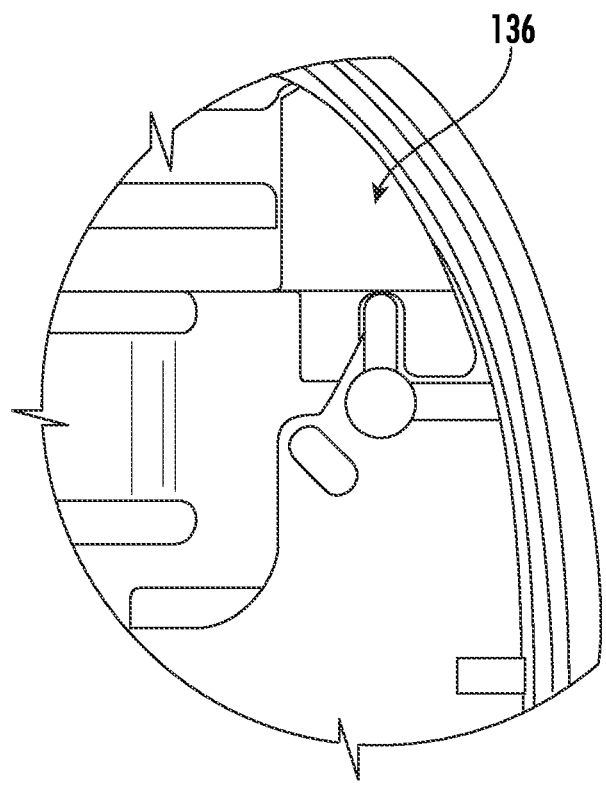

As perhaps best seen in FIGS. 11A-11B, the antenna mount 136 also defines a retention slot 142 for receiving adjacent portions of the first housing section 113a. As will be appreciated, the retention slot 142 prevents the antenna mount 136 from rotating during operation, which would in turn rotate the elongate coil segment 134 and undesirably change receive characteristics of the first coil antenna 131.

Referring now to FIG. 12, the second patch antenna 132 illustratively includes a primary conductive member 143 extending longitudinally and having opposing first and second ends 144a-144b. The primary conductive member 143 may comprise an electrically conductive material, for example, copper or aluminum. The second patch antenna 132 may comprise a wireless local area network (WLAN) antenna operable in one or more of several wireless standards, for example, cellular 5G/4G, Bluetooth, ZigBee, or low power high frequency. As will be appreciated, the second patch antenna 132 may provide a wireless connection to one or more of the mobile device 102 and the base station 104.

The primary conductive member 143 illustratively comprises first and second longitudinal sides 145a-145b extending between the first and second ends 144a-144b and being substantially parallel with each other (i.e. ±°10 of parallel). The second longitudinal side 145b defines a plurality of slots 146a-146c extending inwardly (40-60% of the total width between the first and second longitudinal sides 145a-145b) and transverse (e.g. substantially perpendicular to the second longitudinal side 145b, i.e. ±°10 of perpendicular) to the second longitudinal side. Each of the slots 146a-146c comprises substantially parallel sides (i.e. ±°10 of parallel), and a closed curved end. Also, the second longitudinal side 145b is convex curved in shape, and the first longitudinal side 145a is straight. The first and second ends 144a-144b are also straight and substantially parallel with each other (i.e. ±°10 of parallel).

Figure 6:
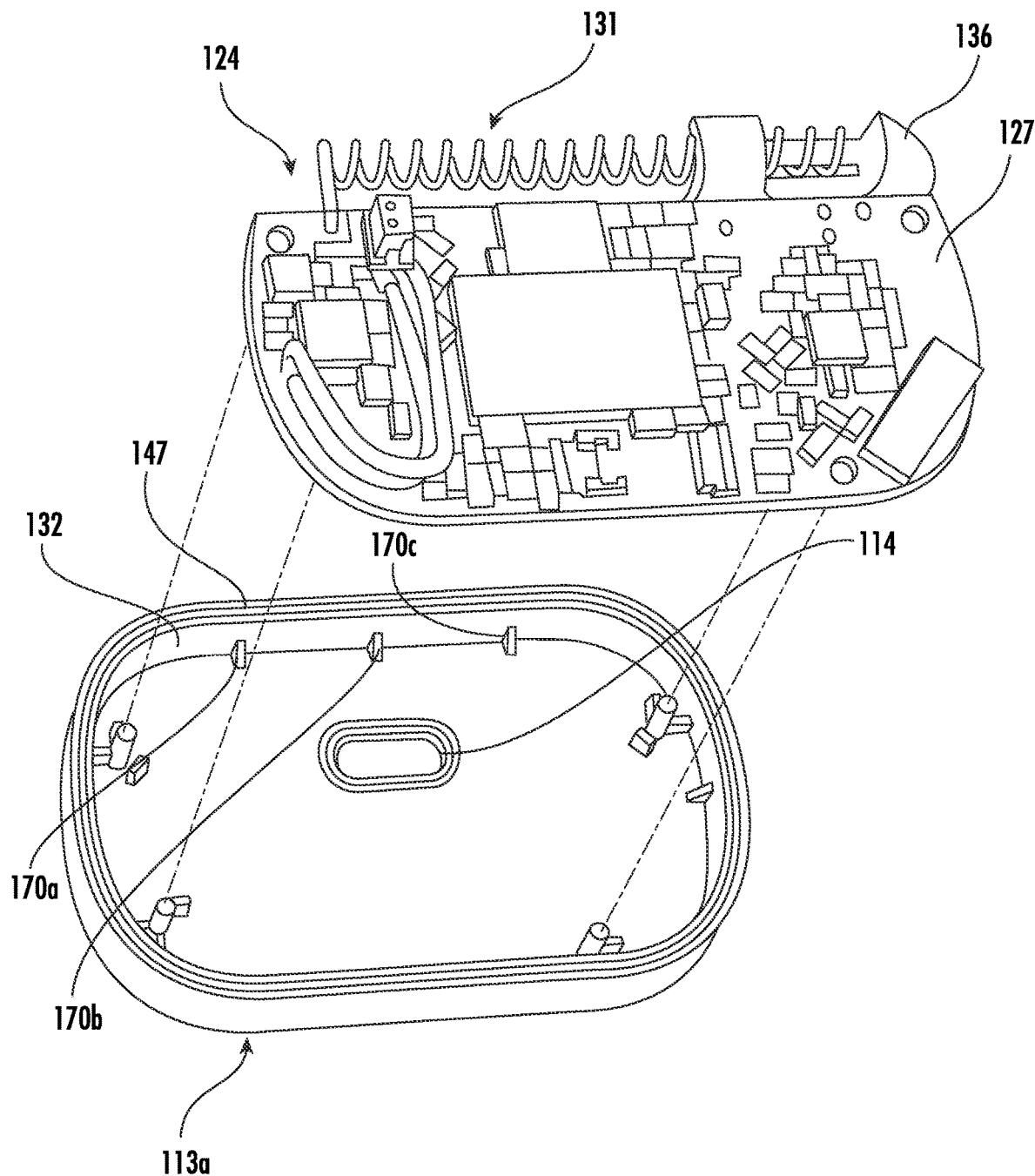
FIG. 6 is a schematic exploded view of the tracker device and the first housing section from the animal collar device in the animal collar system of FIG. 1.
Figure 7:
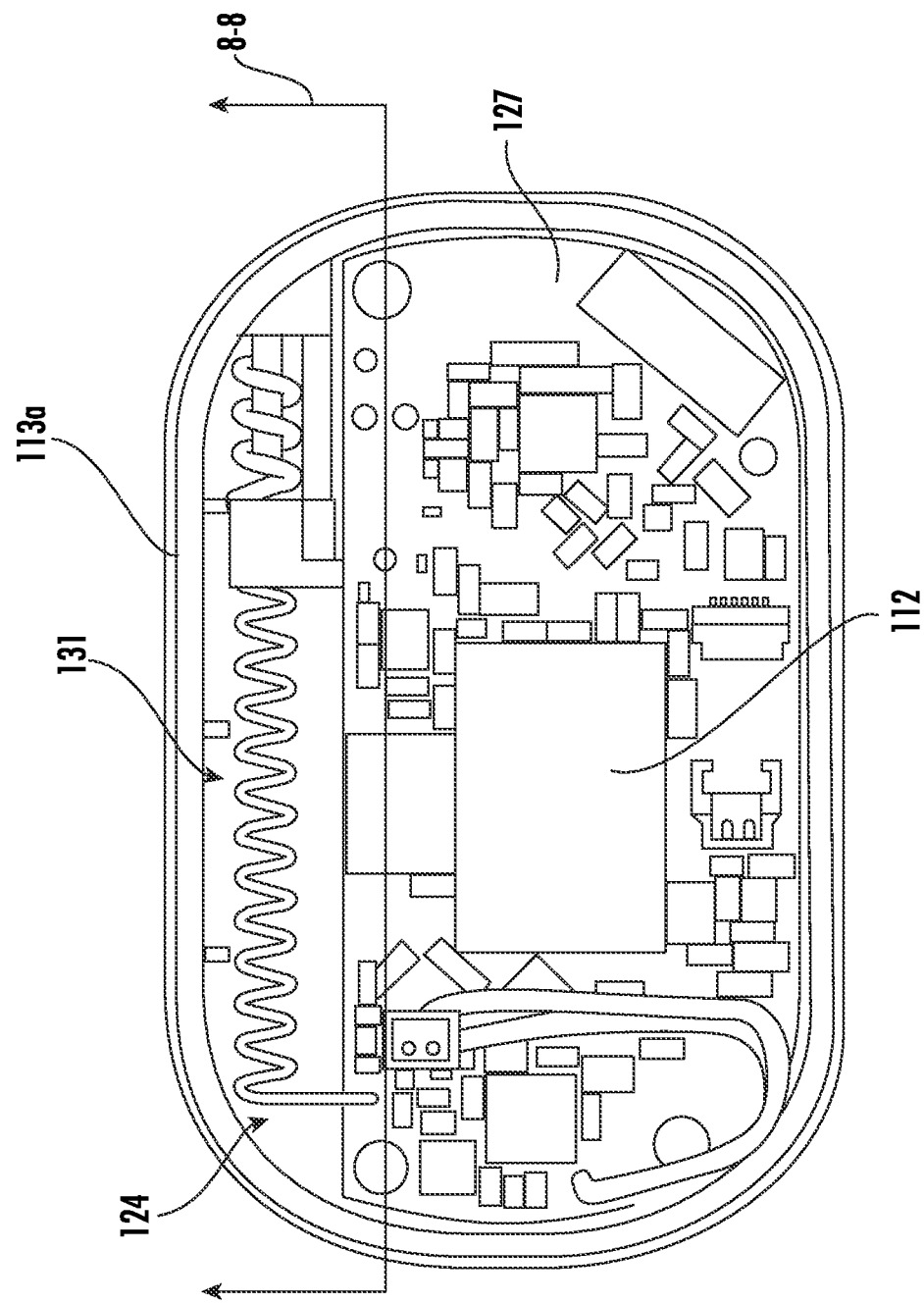
FIG. 7 is a schematic top plan view of the tracker device and the first housing section from the animal collar device in the animal collar system of FIG. 1.
Figure 8:
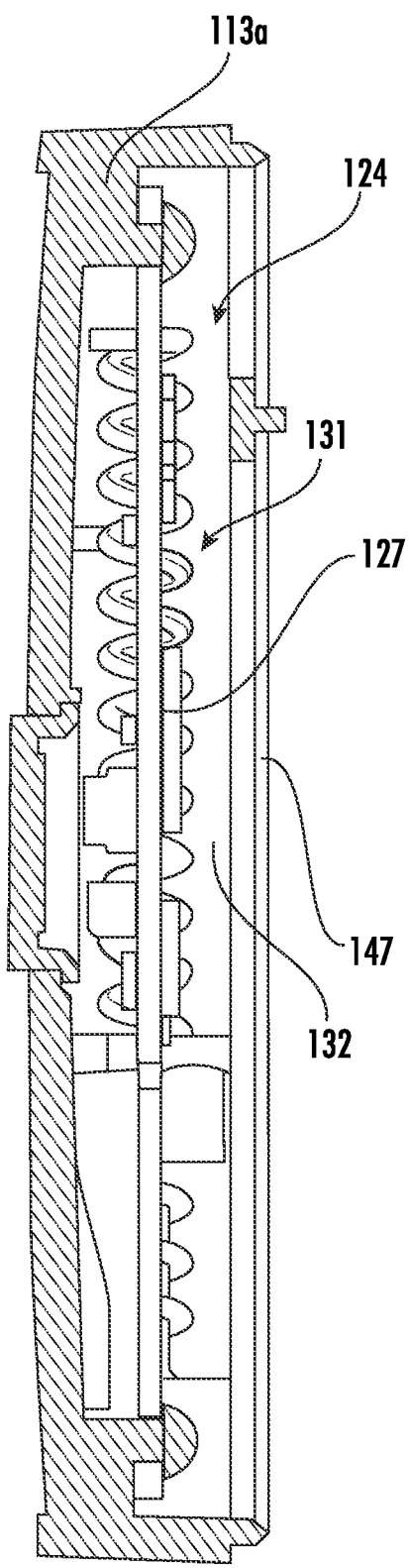
FIG. 8 is a schematic cross-sectional view of the tracker device and the first housing section from the animal collar device in the animal collar system of FIG. 1 along line 8-8.
Figure 9:
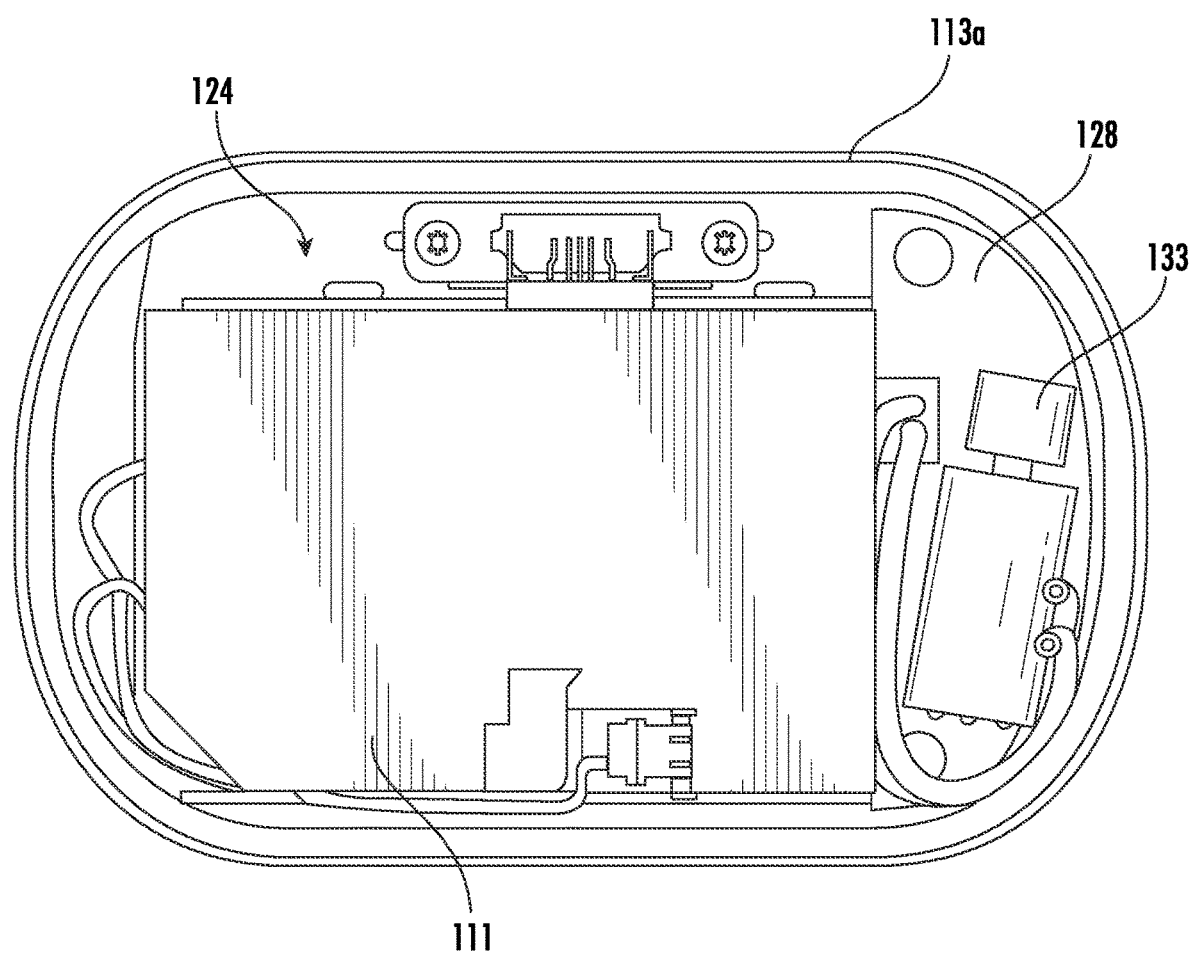
FIG. 9 is a schematic top plan view of the tracker device and the second housing section from the animal collar device in the animal collar system of FIG. 1.
Figure 10D:
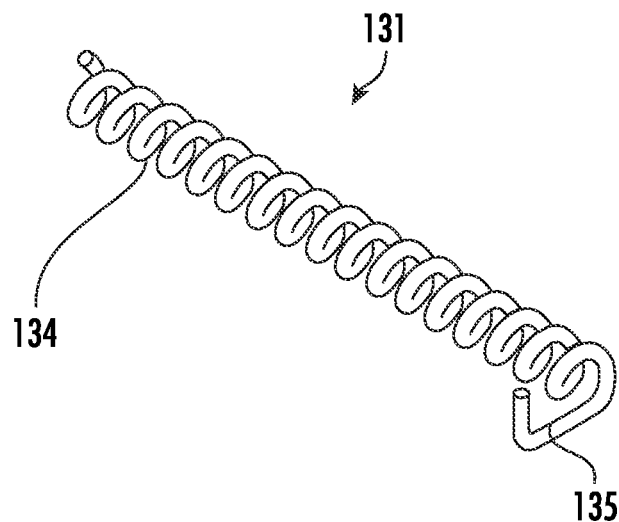
FIG. 10D is a schematic perspective view of the first coil antenna from the animal collar device in the animal collar system of FIG. 1.
Figure 10E:
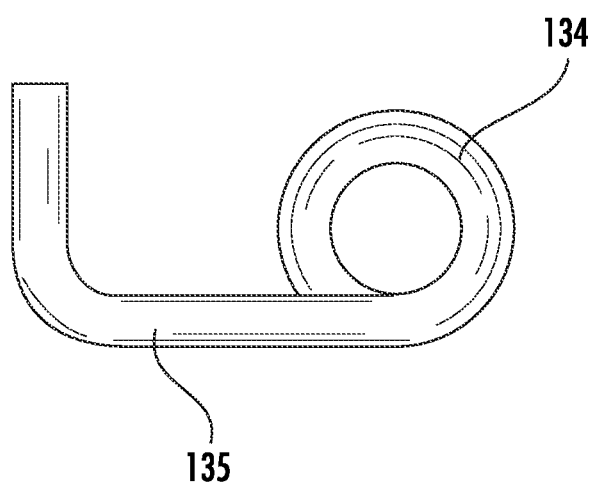
FIG. 10E is a schematic bottom plan view of the first coil antenna from the animal collar device in the animal collar system of FIG. 1.

As perhaps best seen in FIG. 6, the second patch antenna 132 is coupled to the first housing section 113a along an upper peripheral wall 147. Also, the second patch antenna 132 is curved to fit the shape of the upper peripheral wall 147. In particular, the second patch antenna 132 is curved between the first end 144a and the first slot 146a, and the second end 144b and the third slot 146c.

Figure 13A:
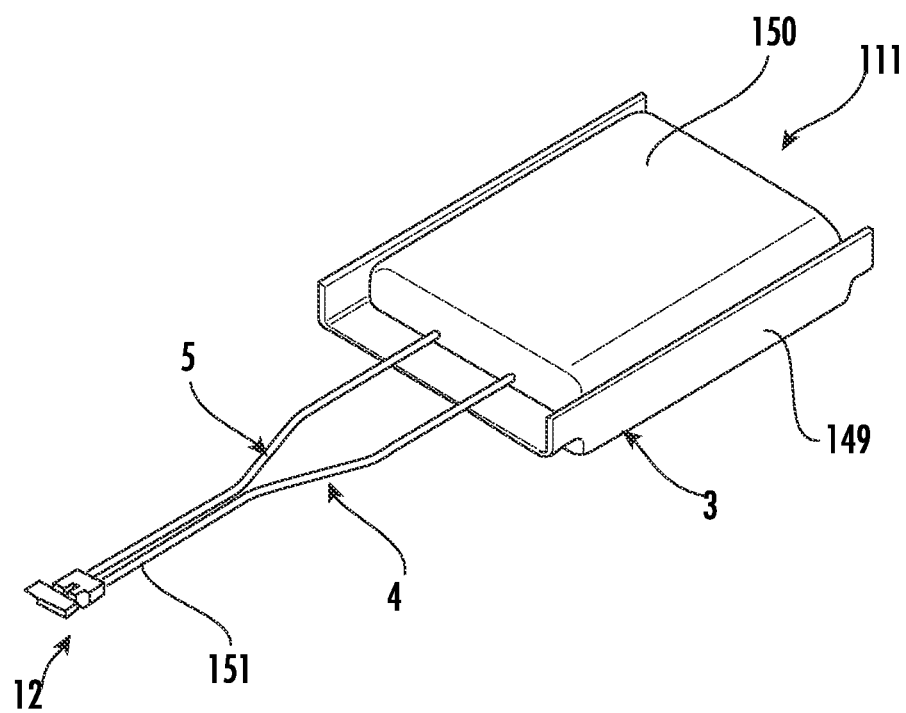
FIG. 13A is a schematic perspective view of the battery from the animal collar device in the animal collar system of FIG. 1.
Figure 13B:
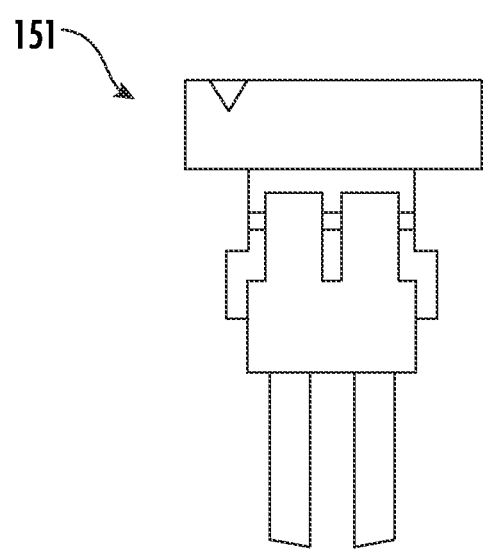
FIG. 13B is a schematic top plan view of the connector from the animal collar device in the animal collar system of FIG. 1.

Referring now to FIGS. 13A-13B, the battery 111 comprises a battery housing 149, a sealed battery cell 150 (e.g. lithium ion battery cell) carried by the battery housing, and a connector 151 coupled thereto. The connector 151 comprises a female plug receptacle with two pin receiving openings, and a pair of connector wires coupled between the two pin receiving openings and respective terminals on the sealed battery cell 150.

Figure 14:
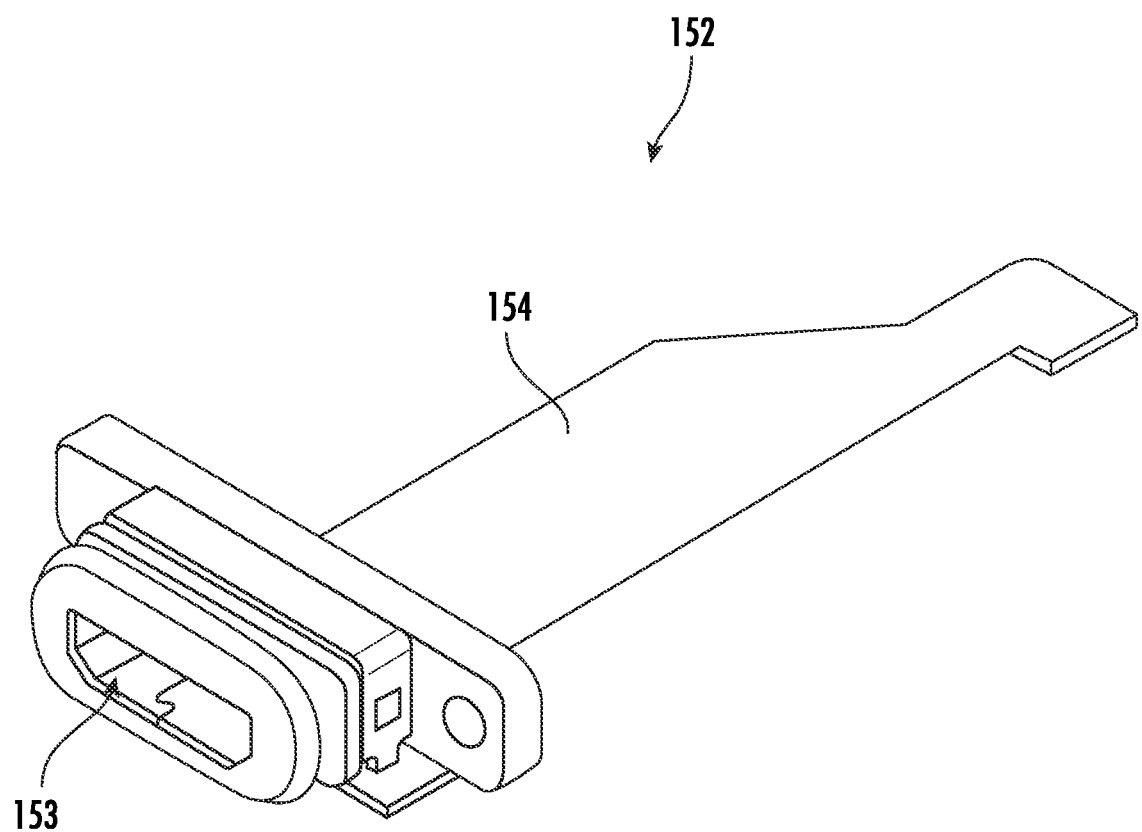
FIG. 14 is a schematic perspective view of the charging connector from the animal collar device in the animal collar system of FIG. 1.

Referring now to FIG. 14, the animal collar device 105 illustratively includes a charging connector 152 coupled to the tracker circuit 124. The charging connector 152 comprises a charging port 153, and a flexible connector layer 154 coupled between the tracker circuit 124 and the charging port. The charging port 153 is carried by the charging port opening 123. The flexible connector layer 154 comprises a flexible dielectric layer, and electrically conductive traces on the flexible dielectric layer defining a plurality of connector pads on a distal end thereof. As will be appreciated, the tracker circuit 124 may include a surface mount technology (SMT) connector for receiving the flexible connector layer 154.

Figure 15A:
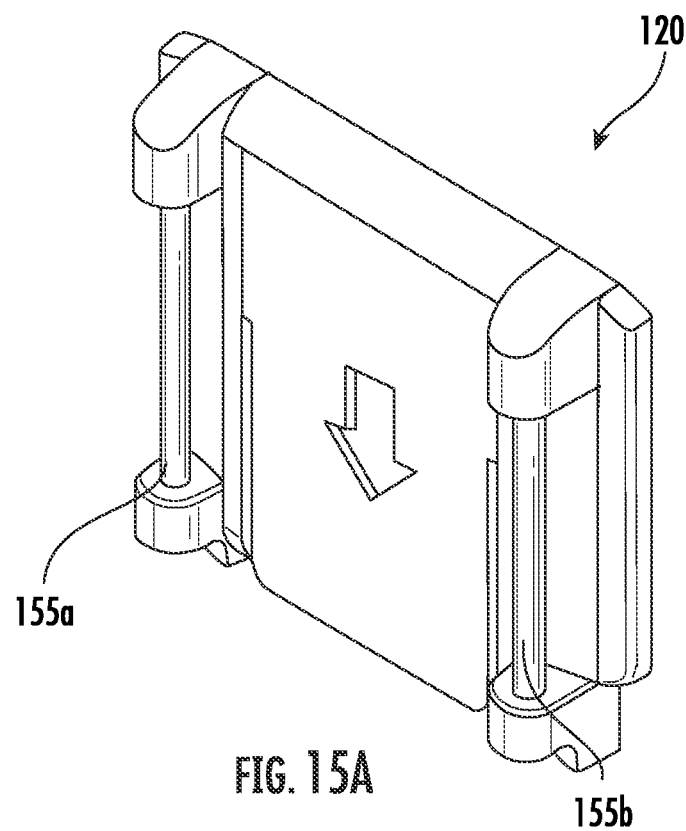
FIGS. 15A, 15B, and 15C are schematic perspective views of the base from the animal collar device in the animal collar system of FIG. 1.
Figure 15B:
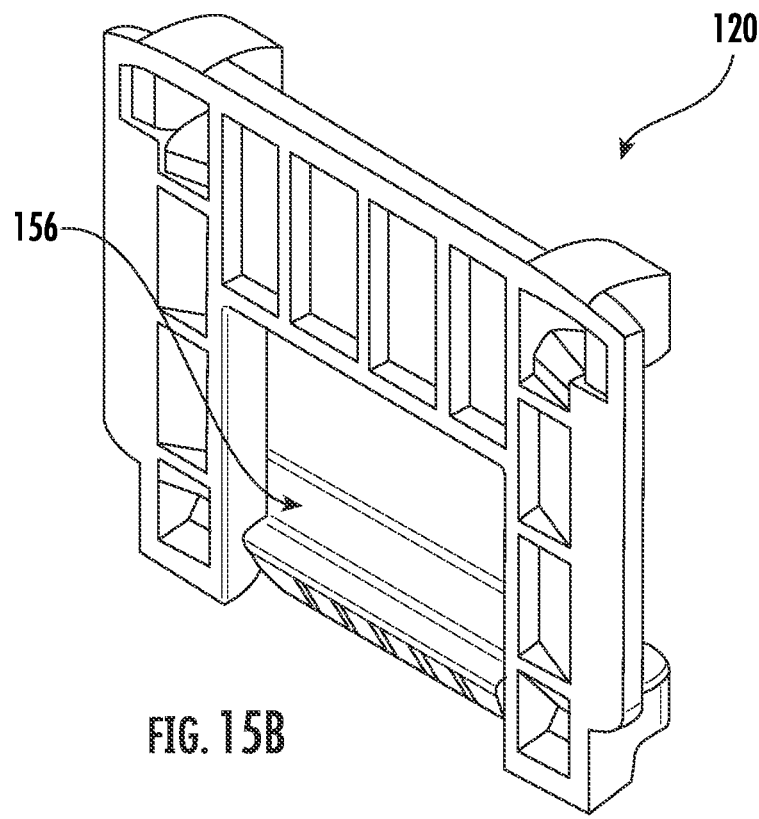
Figure 15C:
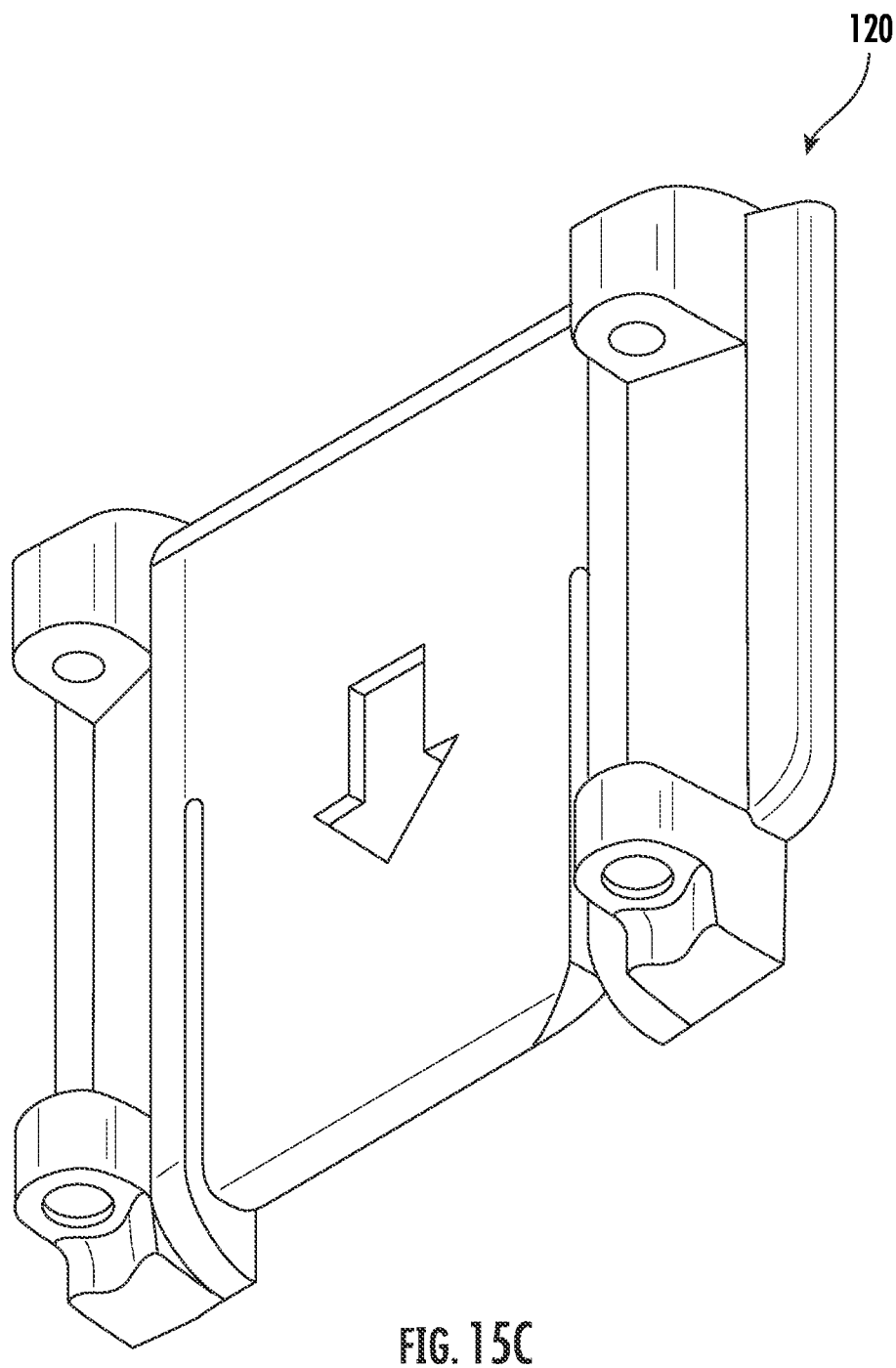
Figure 16:
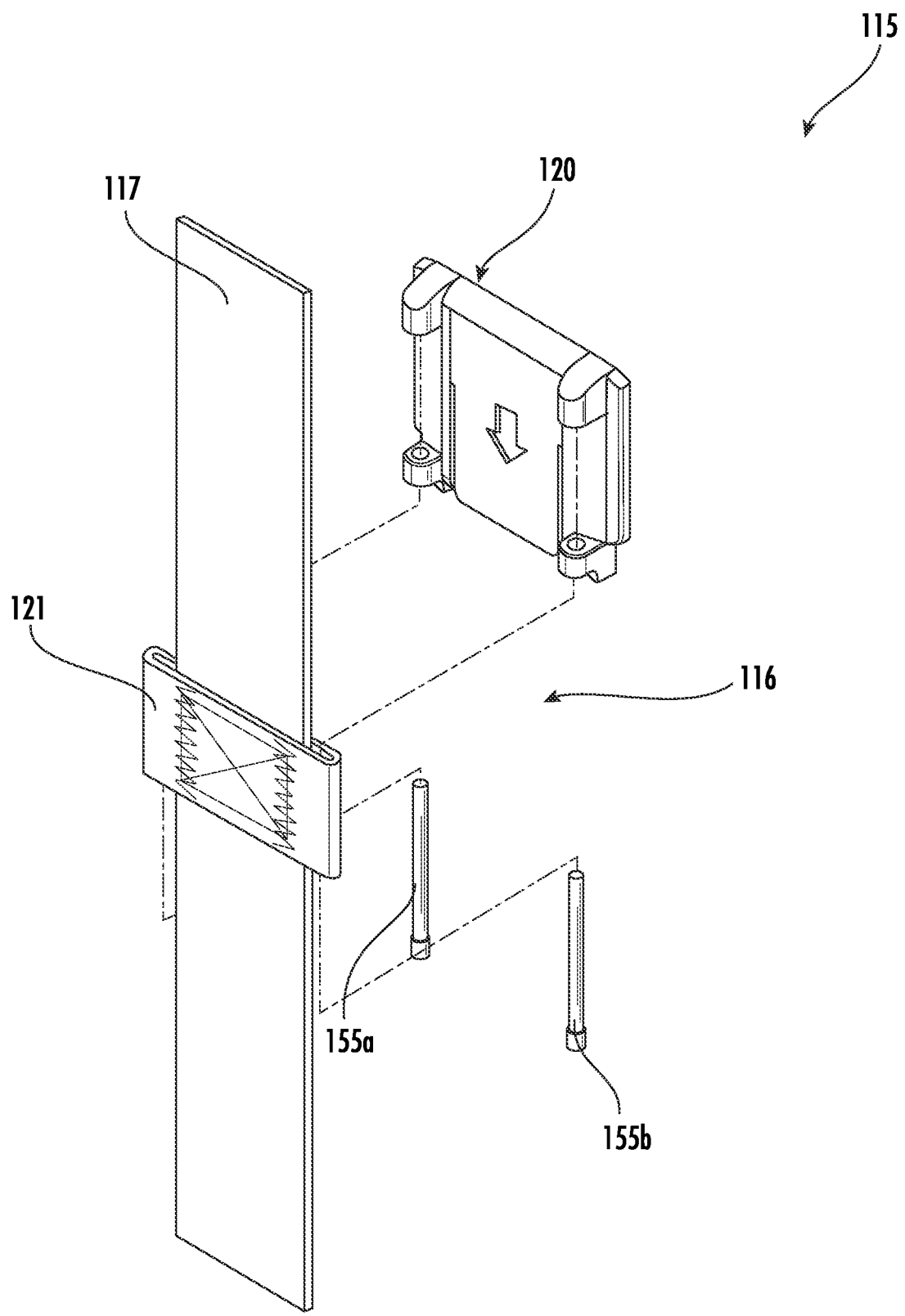
FIG. 16 is a schematic exploded view of the collar assembly in the animal collar system of FIG. 1.

Referring now to FIGS. 15A-16, the collar assembly 115 comprises a retainer device 116, and a strap 117 extending through the retainer device and to wrap around the animal 101. The retainer device 116 comprises a base 120 coupling to the second housing section 113b and a retention arm 121 defining a slot to receive and retain the strap 117. The retention arm 121 illustratively includes first and second pins 155a-155b coupled at opposite ends of the base 120 and extending through passageways in the retention arm 121. In some embodiments, the retention arm 121 may comprise a fabric piece. The base 120 comprises a latch interface 156 for mechanically locking onto the interface 122 of the second housing section 113b.

Figure 17A:
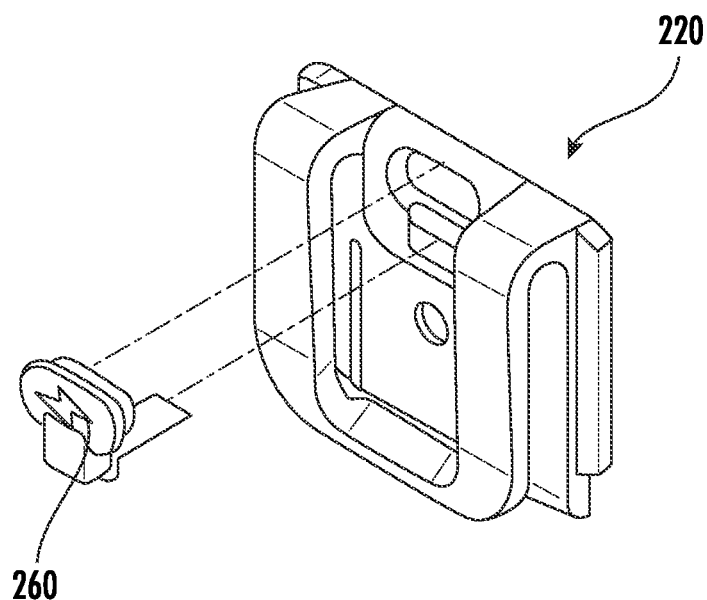
FIGS. 17A and 17B are schematic perspective views of the base from a second example embodiment of the collar assembly from the animal collar device in the animal collar system of FIG. 1.
Figure 17B:
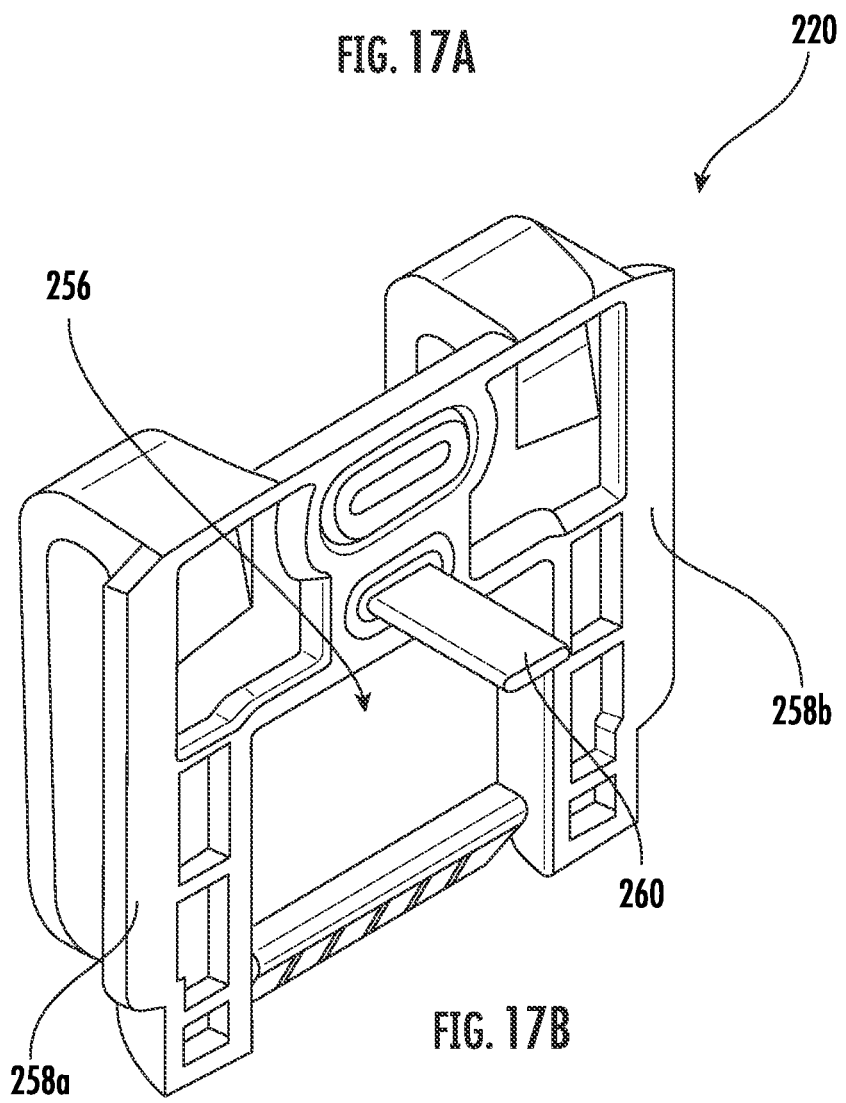
Figure 17C:
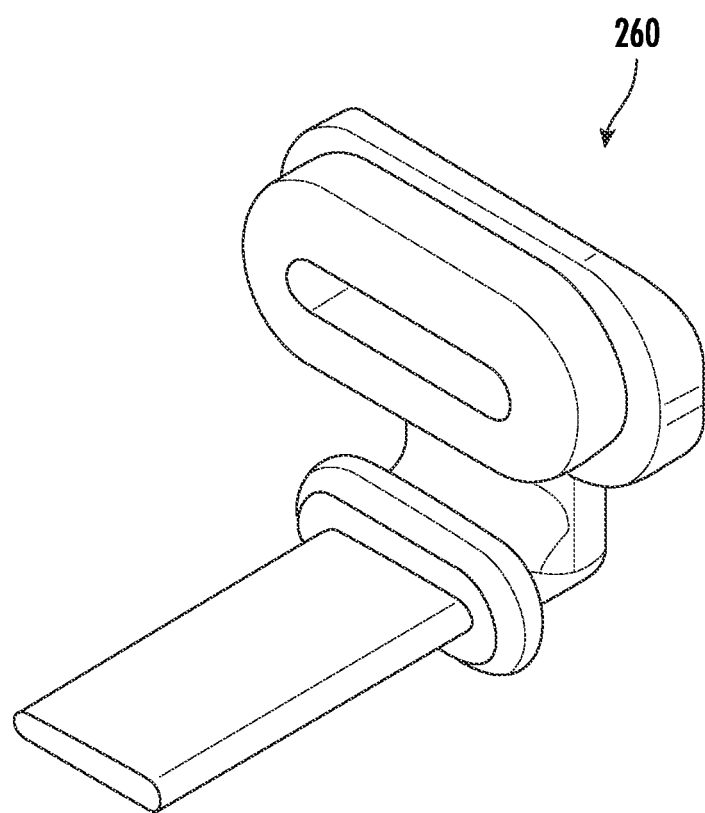
FIG. 17C is a schematic perspective view of the charging port cover from the second example embodiment of the collar assembly.
Figure 18A:
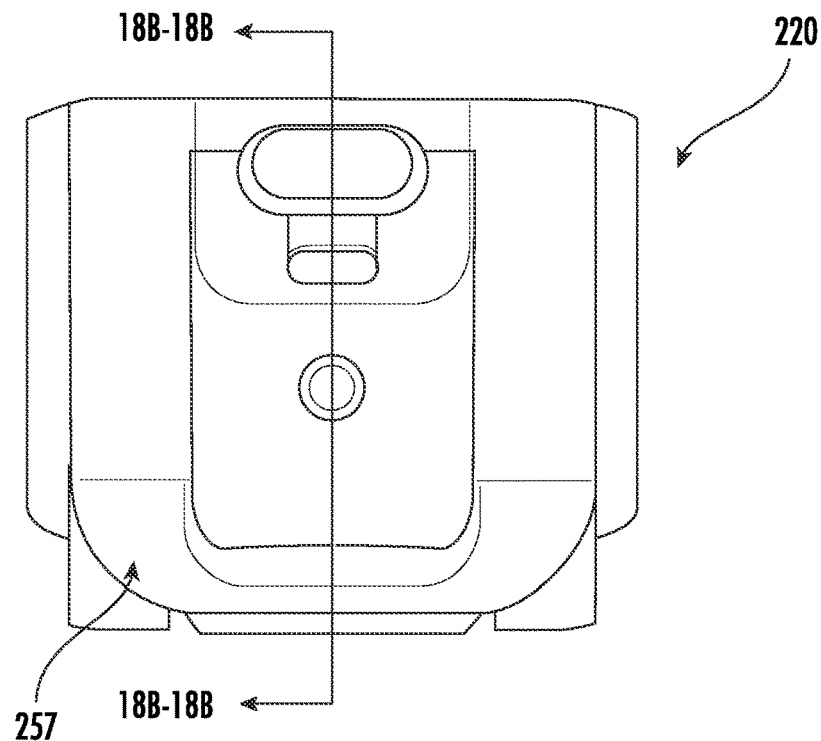
FIGS. 18A and 18B are a schematic back plan view and a schematic cross-sectional view along line 18B-18B, respectively, of the second example embodiment of the collar assembly from the animal collar device in the animal collar system of FIG. 1.
Figure 18B:
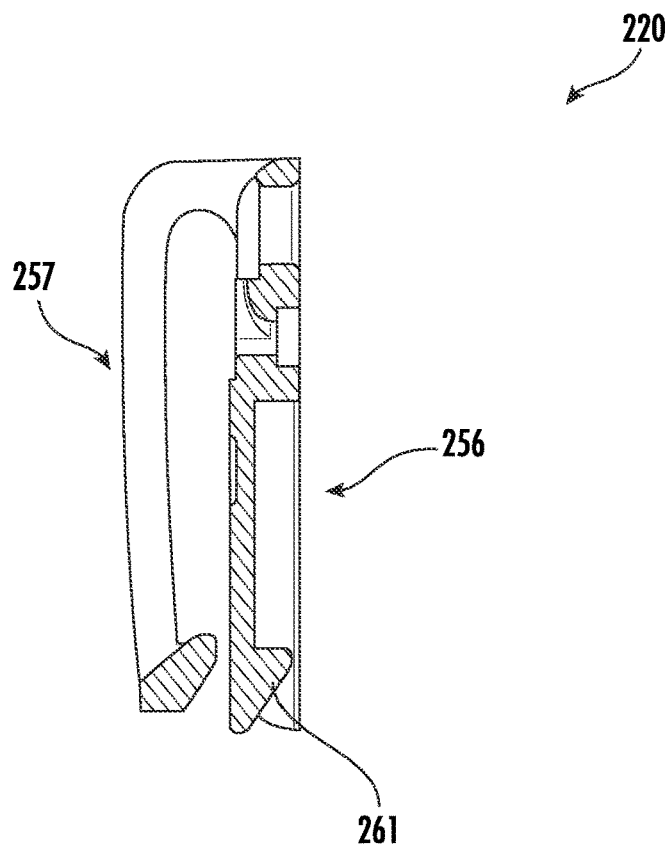
Figure 19:
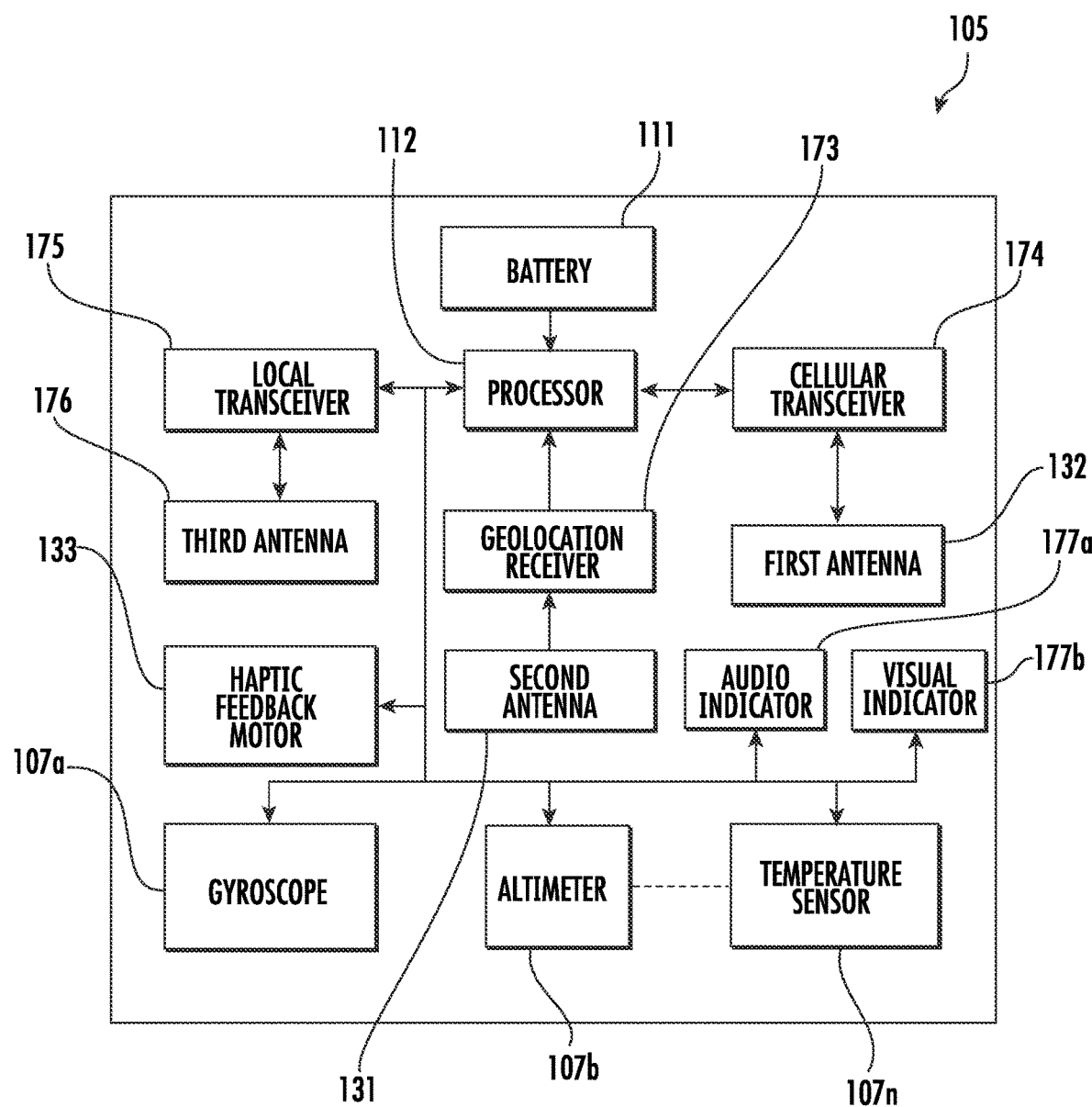
FIG. 19 is a more detailed schematic diagram of the animal collar device in the animal collar system of FIG. 1.

Referring now additionally to FIGS. 17A-17B, another embodiment of the base 220 is now described. In this embodiment of the base 220, those elements already discussed above with respect to FIGS. 1-16 are incremented by 100 and most require no further discussion herein. This embodiment differs from the previous embodiment in that this base 220 illustratively includes a belt clip interface 257 for attachment to a collar of the animal 101. Here, the base 220 illustratively includes a cover 260 for the charging port.

Referring again briefly and additionally to FIG. 4, the base 220 comprises a latch interface 256 for mechanically locking onto the interface 122 of the second housing section 113b. The latch interface 256 comprises a latch arm 261 to latch on the interface 122 of the second housing section 113b. In particular, the base 220 includes opposing first and second lateral ridges 258a-258b for respectively slidingly engaging the first and second opposing slots 126a-126b of the second housing section 113b. As this sliding action proceeds, the latch arm 261 engages the ramp 125 and elastically bends upward until a most distal portion of the latch arm 261 reaches the end of the ramp 125, which causes this latch arm to return to a non-flexed state, thereby latching onto the end of the ramp. It should be appreciated that the latching mechanism of the embodiment of the base 120 from FIGS. 15A-16 operates similarly.

Referring again to FIGS. 1-12 and now 19, an animal collar system 100 for monitoring an animal 101 (e.g. canine, cat) is now described. The animal collar system 100 illustratively includes a mobile device 102 associated with a user 103, a base station 104 (e.g. a WiFi base station, or a cellular base station), and an animal collar device 105.

The animal collar device 105 comprises a circuit board 127, a plurality of sensing components 107a-107n carried by the circuit board and configured to collect data about the animal 101, and a cellular transceiver 174 (e.g. 5G cellular wireless transceiver) coupled to the processor 112. The plurality of sensing components 107a-107n illustratively includes a gyroscope device 107a, an altimeter device 107b, and a temperature sensor 107n, for example. Of course, other embodiments may include other sensing components, such as a heart rate sensor.

The animal collar device 105 comprises a first elongate patch antenna 132 carried by the circuit board 127 and coupled to the cellular transceiver. The first elongate patch antenna 132 comprises an electrically conductive material, for example, one or more of aluminum, copper, silver, or gold.

The first elongate patch antenna 132 comprises a first longitudinal side 145a and a second longitudinal side 145b opposing the first longitudinal side, and a first end 144a and a second end 144b opposing the first end. The first and second ends 144a-144b are between the first and second longitudinal sides 145a-145b. The second longitudinal side 145b illustratively includes a plurality of slots 146a-146c.

The animal collar device 105 include a processor 112 carried by the circuit board 127 and coupled to the plurality of sensing components 107a-107n and the first elongate patch antenna 132. The processor 112 is configured to communicate the data about the animal 101 to the base station 104 and the mobile device 102.

The animal collar device 105 illustratively comprises a housing 113a-113b carrying the circuit board 127, the plurality of sensing components 107a-107n, the first elongate patch antenna 132, and the processor 112. Each of the plurality of slots may comprise substantially parallel sides, and a curved end extending into the substantially parallel sides. In particular, the housing illustratively includes a first housing section 113a, and a second housing section 113b.

As perhaps best seen in FIG. 6, the first elongate patch antenna 132 has a non-planar shape and is carried by the first housing section 113a. In particular, the first end 144a and the second end 144b each comprises a curved end. From a top plan view, the first elongate patch antenna 132 is U-shaped. Also, it can be see that the first elongate patch antenna 132 abuts and follows the shape of the first housing section 113a. Moreover, the first housing section 113a illustratively includes a plurality of protrusions 170a-170c to extend respectively through the plurality of slots 146a-146c. As will be appreciated, this may prevent movement of the first elongate patch antenna 132 during jarring movement from the animal 101.

The animal collar device 105 illustratively comprises a geolocation receiver 173 coupled to the processor 112, and a second coil antenna 131 coupled to the geolocation receiver and carried by the circuit board 127 and coupled to the processor 112. In some embodiments, the geolocation receiver 173 may comprise a GPS receiver. The second coil antenna 131 comprises an electrically conductive material, for example, one or more of aluminum, copper, silver, or gold. The second coil antenna 131 comprises an elongate coil segment 134, and a feed arm 135 coupled between the elongate coil segment and the processor 112. The second coil antenna 131 comprises an antenna mount 136 to be coupled to the circuit board 127. The antenna mount 136 comprises a retention arm 137 coupled to the circuit board 127 (i.e. retaining and clipping the circuit board), an inner antenna arm 171 extending from the retention arm and within the elongate coil segment 134, and an outer arm 172 extending from the retention arm and radially around the elongate coil segment. For example, the antenna mount 136 may comprise a dielectric material, such as a polymer plastic.

Further, the animal collar device 105 illustratively includes a haptic feedback motor 133 coupled to the processor 112. The haptic feedback motor 133 is configured to generate a mechanical indication to the animal 101 when desired. For example, during training, the haptic feedback motor 133 may be used to provide feedback to the animal 101 when correction is needed. Additionally, the animal collar device 105 illustratively includes an audio indicator 177a (e.g. a speaker) coupled to the processor 112 and configured to generate an audio alert (e.g. audio melody) to provide positive feedback to the animal 101 during training.

The animal collar device 105 illustratively includes a visual indicator 177b (e.g. an LED) coupled to the processor 112 and configured to generate a visual alert to provide positive/negative feedback to the animal 101 during training. Also, the visual indicator 177b may be configured to provide illumination when the animal 101 is traversing a dark area (e.g. when walking the animal at night).

The animal collar system 100 illustratively includes a local beacon 109, which comprises a beacon wireless transmitter configured to broadcast a beacon signal, and a beacon battery coupled to the wireless transmitter. In some embodiments, the beacon wireless transmitter comprises one or more of a Bluetooth wireless transmitter, and a ZigBee wireless transmitter. The animal collar device 105 includes a companion local wireless transceiver (or receiver) 175, and a third antenna 176 coupled thereto configured to receive the beacon signal. The processor 112 is configured to generate a received signal strength value for the beacon signal to provide a proxy value for a distance to the local beacon 109. The local beacon 109 may be positioned in a home of the user 103, and the processor 112 is configured to generate an alert indication (e.g. a text/chat/email message to the mobile device 102, or a notification message to the mobile device) when the distance to the local beacon 109 exceeds a threshold. In other words, when the animal 101 has left the home, the user 103 would be notified (i.e. acting as a virtual leash of sorts). In some embodiments, the processor 112 is configured to generate a corrective indication to the animal 101 when the distance to the local beacon 109 exceeds the threshold. For example, the processor 112 is configured to activate one or more of the haptic feedback motor 133, the audio indicator 177a, and the visual indicator 177b.

In some embodiments, the processor 112 is configured to cooperate with the local beacon 109 in a reverse fashion, in other words, providing a keep out zone for the animal 101. Here, the processor 112 is configured to generate the corrective indication to the animal 101 when the distance to the local beacon 109 is less than the threshold. For example, the local beacon 109 may be placed in the kitchen, and when the animal 101 approaches the kitchen, the corrective indication to the animal would guide the animal away.

Another aspect is directed to a method for operating an animal collar device 105 monitoring an animal 101. The animal collar device 105 is in communication with a mobile device 102 associated with a user 103 and a base station 104. The animal collar device 105 comprises at least one sensing component 107a-107n to be carried by a circuit board 127 and configured to collect data about the animal 101, and a first elongate patch antenna 132 to be carried by the circuit board. The first elongate patch antenna 132 comprises a first longitudinal side 145a and a second longitudinal side 145b opposing the first longitudinal side, and a first end 144a and a second end 144b opposing the first end. The first and second ends 144a-144b are between the first and second longitudinal sides 145a-145b, and the second longitudinal side comprises a plurality of slots 146a-146c. The method comprises operating a processor 112 to be carried by the circuit board 127 and to be coupled to the at least one sensing component 107a-107n and the first elongate patch antenna 132, the processor configured to communicate the data about the animal 101 to the base station 104 and the mobile device 102.

Yet another aspect is directed to a method for making an animal collar device 105 for monitoring an animal 101 and in communication with a mobile device 102 associated with a user 103 and a base station 104. The method includes coupling a plurality of sensing components 107a-107n to be carried by a circuit board 127 and configured to collect data about the animal 101, and coupling a first elongate patch antenna 132 to be carried by the circuit board and comprising a first longitudinal side 145a and a second longitudinal side 145b opposing the first longitudinal side, and a first end 144a and a second end 144b opposing the first end. The first and second ends 144a-144b are between the first and second longitudinal sides 145a-145b, and the second longitudinal side comprises a plurality of slots 146a-146c. The method includes coupling a processor 112 to be carried by the circuit board 127 and to be coupled to the plurality of sensing components 107a-107n and the first elongate patch antenna 132, the processor configured to communicate the data about the animal 101 to the base station 104 and the mobile device 102.

Figure 20A:
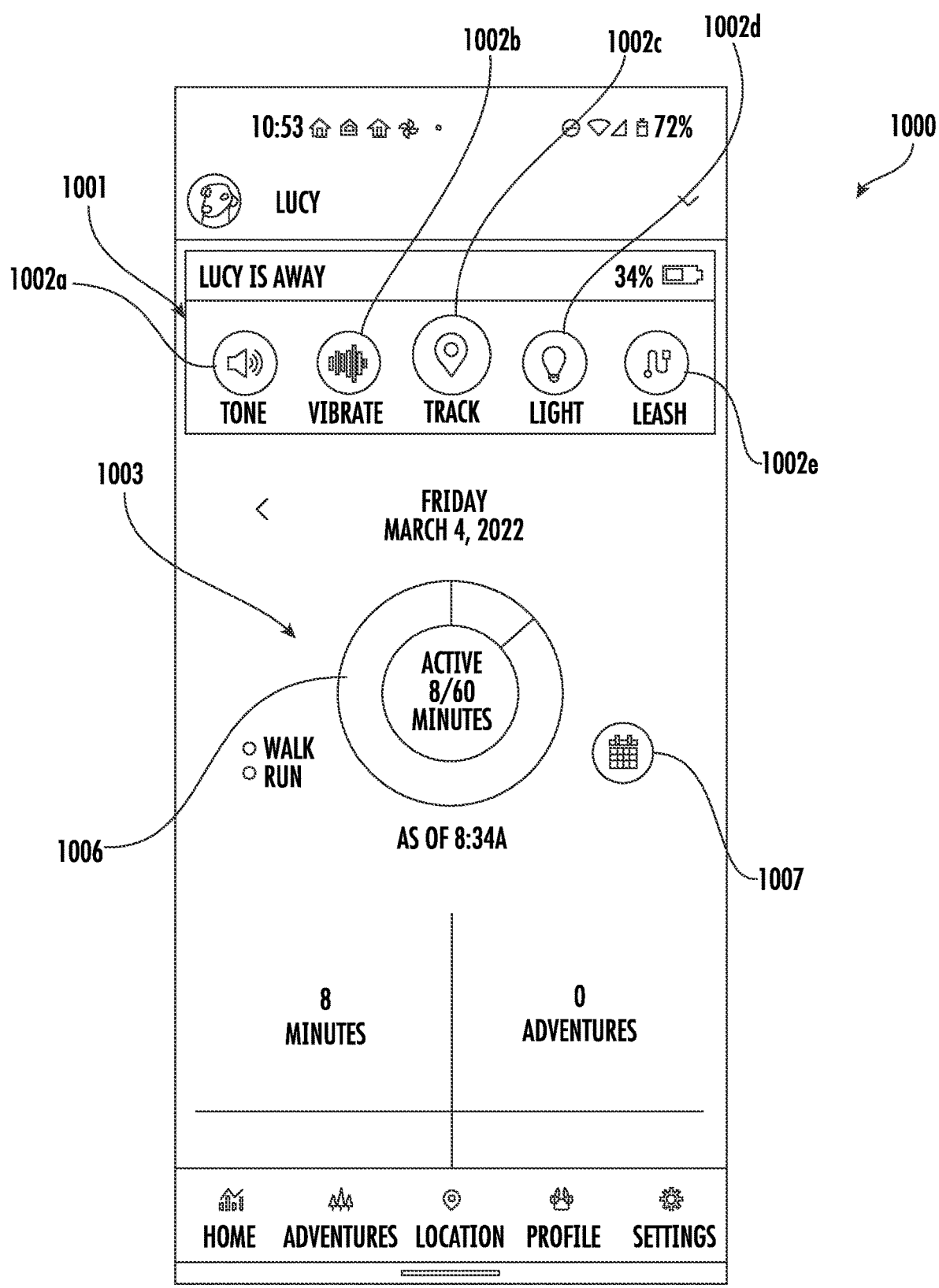
FIGS. 20A-20E are screenshots of an example embodiment of a user interface for the mobile device in the animal collar system of FIG. 1.
Figure 20B:
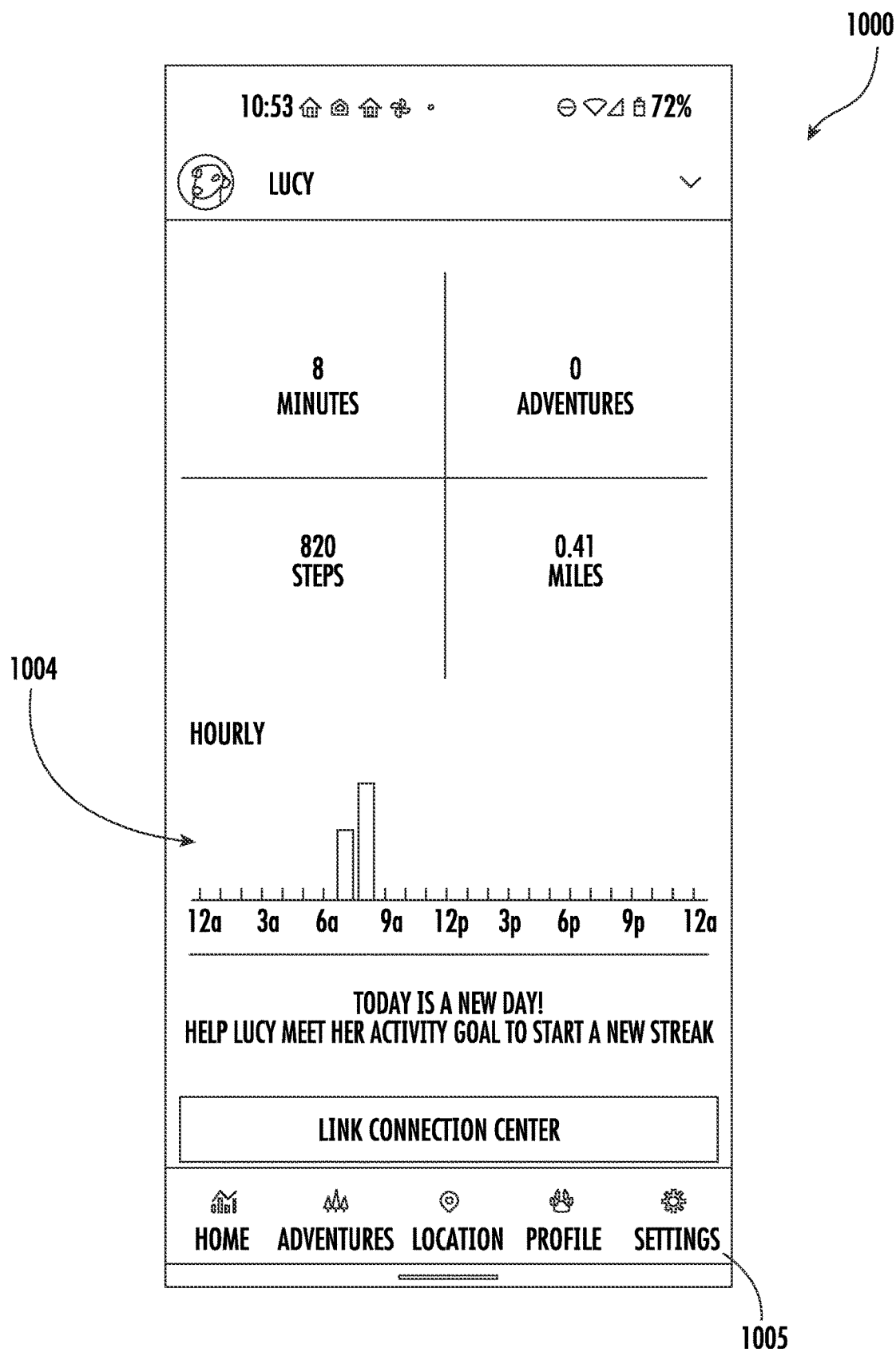
Figure 20C:
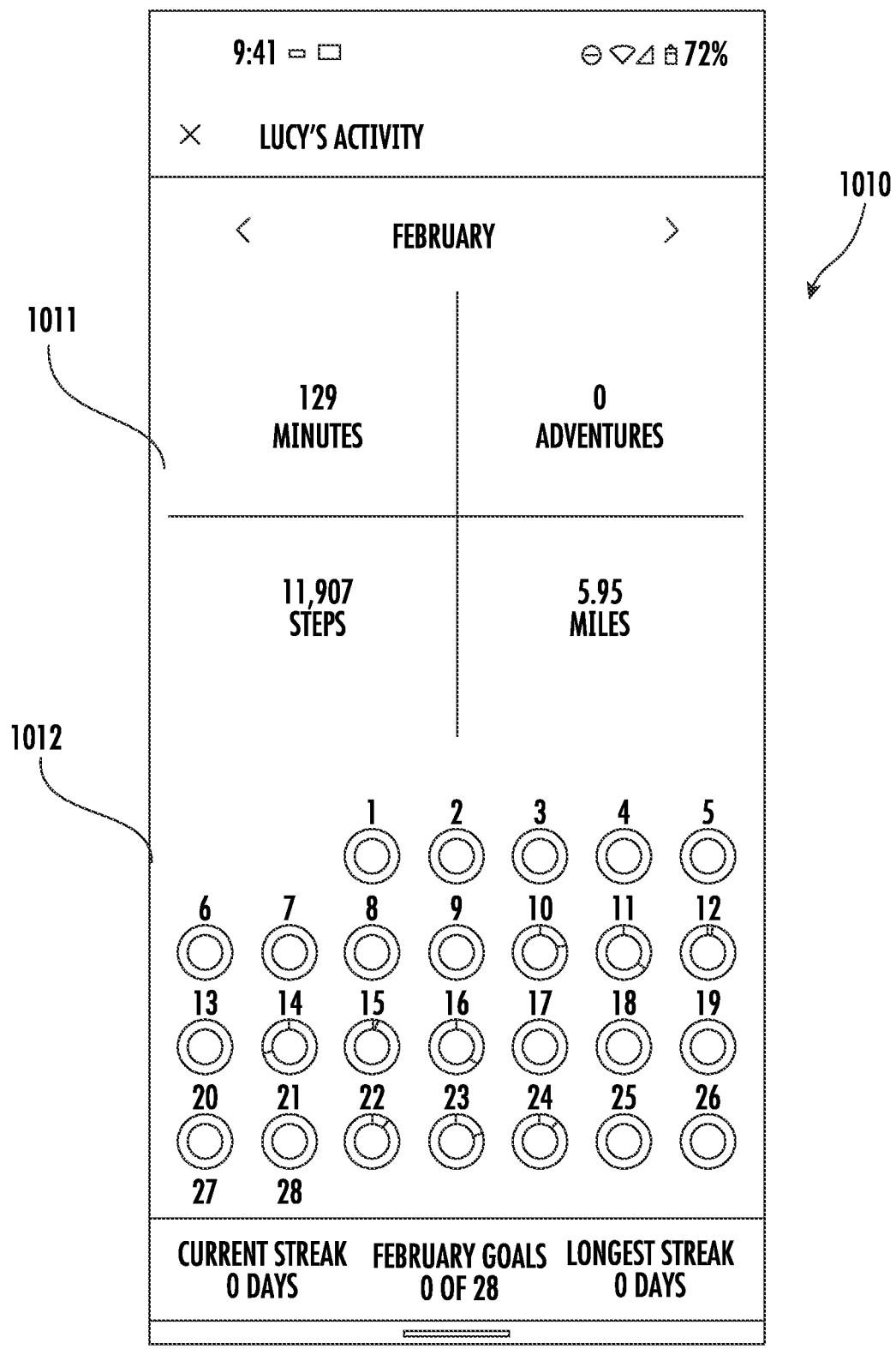
Figure 20D:
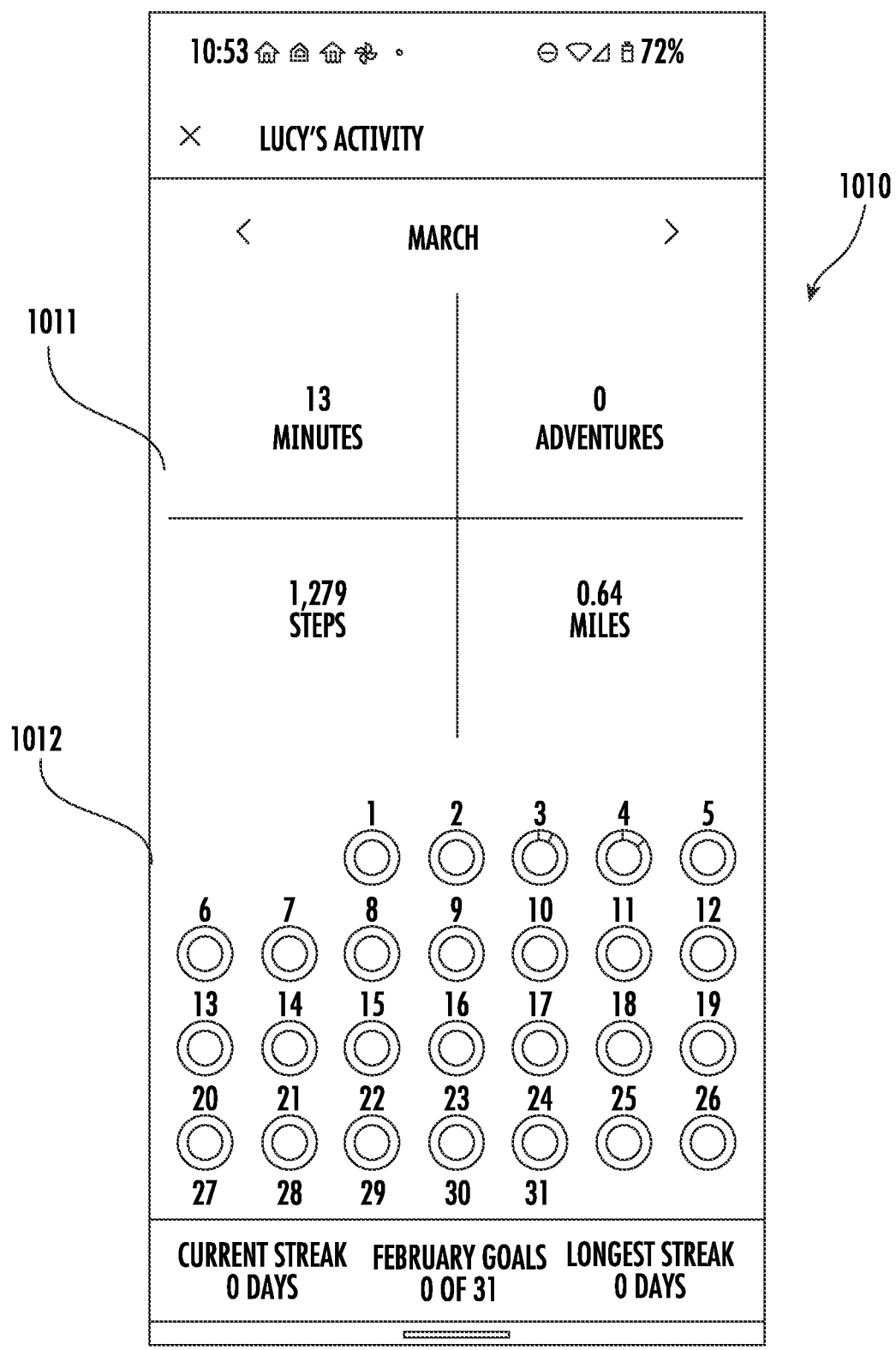
Figure 20E:
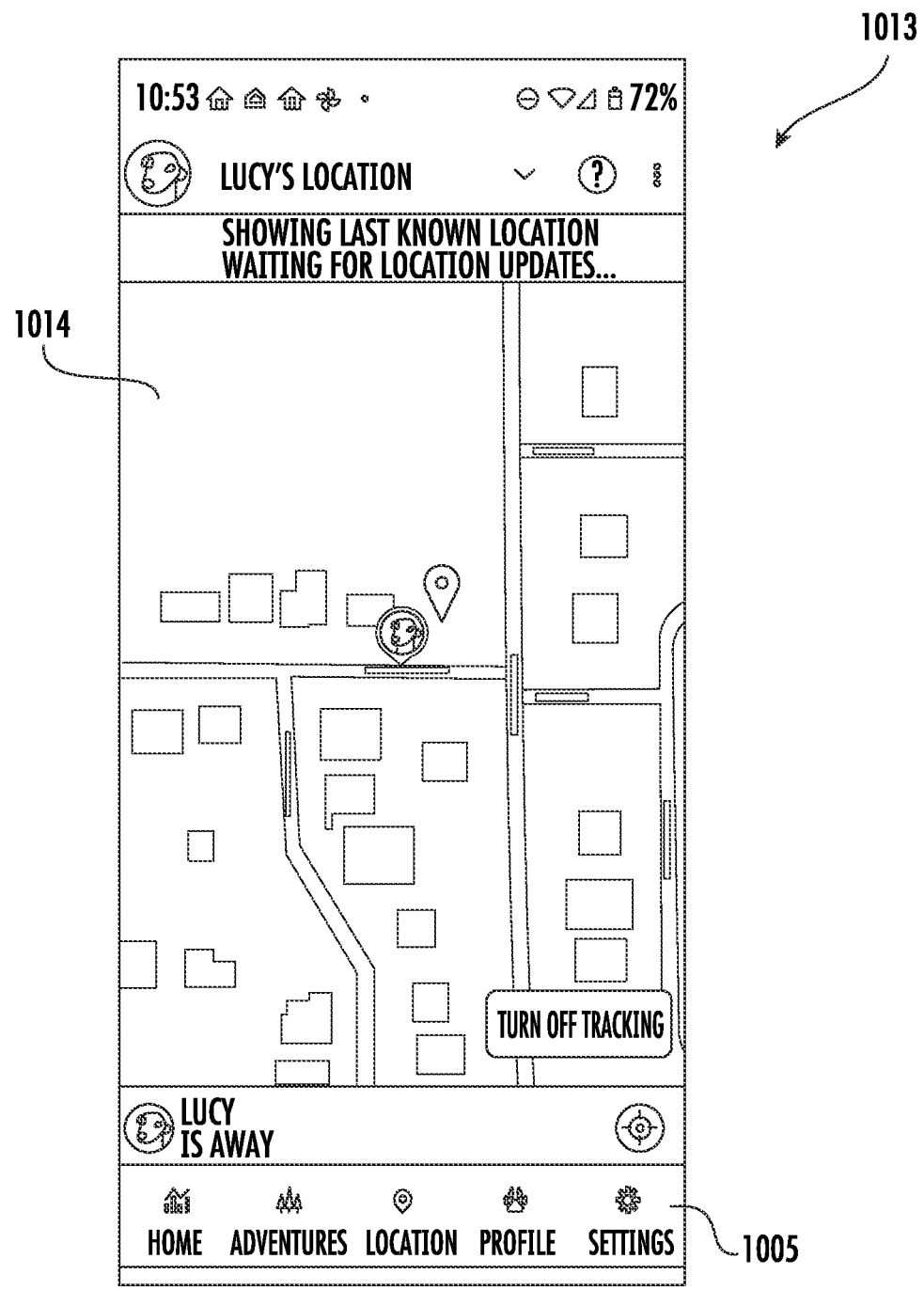

Referring now to FIGS. 20A-20E, an exemplary user interface for the mobile device 102 is shown. In some embodiments, the mobile device 102 is configured to execute a companion software application for the animal collar device 105. As will be appreciated, the companion software application may operate as a native mobile operating system application or a webpage application (e.g. Web 3.0). FIGS. 20A-20B include a home screen interface 1000 for the companion software application. The home screen interface 1000 illustratively includes a control ribbon interface 1001 having a plurality of quick access buttons 1002a-1002e. The plurality of quick access buttons 1002a-1002e comprises a tone button 1002a (activating the audio indicator 177a), a vibrate button 1002b (activating the haptic feedback motor 133), a track button 1002c (activating the geolocation receiver 173), a light button 1002d (activating the visual indicator 177b), and a leash button 1002e (activating the local transceiver 175 for detecting the local beacon 109). The home screen interface 1000 illustratively includes a daily summary interface 1003, an hourly summary interface 1004, and a lower ribbon interface 1005. The daily summary interface 1003 illustratively comprises a progress gauge 1006, and a calendar button 1007. When the calendar button 1007 is clicked, the companion software application transitions to a calendar interface 1010. The calendar interface 1010 illustratively comprises a monthly aggregate interface 1011, and a calendar interface 1012 for viewing respective data for days. The monthly aggregate interface 1011 comprises a plurality of data values (i.e. active minutes, steps, distance traveled, and adventures). Helpfully, the calendar interface 1012 includes respective gauges for how much activity has been registered for each day in the month.

When the track button 1002c is clicked, the companion software application transitions to a tracking interface 1013. The tracking interface 1013 illustratively comprises the same lower ribbon interface 1005, and a map interface 1014 showing a location of the animal collar device 105 via the geolocation receiver 173.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An animal collar system for monitoring an animal, the animal collar system comprising:
 a mobile device associated with a user;
 a base station; and
 an animal collar device comprising
  a circuit board,
  at least one sensing component carried by the circuit board and configured to collect data about the animal,
  a first elongate patch antenna carried by the circuit board and comprising
   a first longitudinal side and a second longitudinal side opposing the first longitudinal side, and
   a first end and a second end opposing the first end, the first and second ends being between the first and second longitudinal sides, the second longitudinal side comprising a plurality of slots, and
  a processor carried by the circuit board and coupled to the at least one sensing component and the first elongate patch antenna, the processor configured to communicate the data about the animal to the base station and the mobile device.

2. The animal collar system of claim 1 wherein the first elongate patch antenna has a non-planar shape.

3. The animal collar system of claim 1 wherein the first end and the second end each comprises a curved end.

4. The animal collar system of claim 1 wherein the animal collar device comprises a second coil antenna carried by the circuit board and coupled to the processor.

5. The animal collar system of claim 4 wherein the second coil antenna comprises an elongate coil segment, and a feed arm coupled between the elongate coil segment and the processor.

6. The animal collar system of claim 5 wherein the second coil antenna comprises a mount comprising a retention arm coupled to the circuit board, and an inner antenna arm extending from the retention arm and within the elongate coil segment.

7. The animal collar system of claim 6 wherein the mount comprises an outer arm extending from the retention arm and radially around the elongate coil segment.

8. The animal collar system of claim 6 wherein the mount comprises a dielectric material.

9. The animal collar system of claim 1 wherein the animal collar device comprises a housing carrying the circuit board, the at least one sensing component, the first elongate patch antenna, and the processor.

10. The animal collar system of claim 1 wherein each of the plurality of slots comprises substantially parallel sides, and a curved end extending into the substantially parallel sides.

11. An animal collar device for monitoring an animal and in communication with a mobile device associated with a user and a base station, the animal collar device comprising:
a circuit board;
at least one sensing component carried by the circuit board and configured to collect data about the animal;
a first elongate patch antenna carried by the circuit board and comprising
a first longitudinal side and a second longitudinal side opposing the first longitudinal side, and
a first end and a second end opposing the first end, the first and second ends being between the first and second longitudinal sides, the second longitudinal side comprising a plurality of slots; and
a processor carried by the circuit board and coupled to the at least one sensing component and the first elongate patch antenna, the processor configured to communicate the data about the animal to the base station and the mobile device.

12. The animal collar device of claim 11 wherein the first elongate patch antenna has a non-planar shape.

13. The animal collar device of claim 11 wherein the first end and the second end each comprises a curved end.

14. The animal collar device of claim 11 further comprising a second coil antenna carried by the circuit board and coupled to the processor.

15. The animal collar device of claim 14 wherein the second coil antenna comprises an elongate coil segment, and a feed arm coupled between the elongate coil segment and the processor.

16. The animal collar device of claim 15 wherein the second coil antenna comprises a mount comprising a retention arm coupled to the circuit board, and an inner antenna arm extending from the retention arm and within the elongate coil segment.

17. The animal collar device of claim 16 wherein the mount comprises an outer arm extending from the retention arm and radially around the elongate coil segment.

18. A method for operating an animal collar device monitoring an animal and in communication with a mobile device associated with a user and a base station, the animal collar device comprising at least one sensing component to be carried by a circuit board and configured to collect data about the animal, a first elongate patch antenna to be carried by the circuit board and comprising a first longitudinal side and a second longitudinal side opposing the first longitudinal side, and a first end and a second end opposing the first end, the first and second ends being between the first and second longitudinal sides, the second longitudinal side comprising a plurality of slots, the method comprising:
operating a processor to be carried by the circuit board and to be coupled to the at least one sensing component and the first elongate patch antenna, the processor configured to communicate the data about the animal to the base station and the mobile device.

19. The method of claim 18 wherein the first elongate patch antenna has a non-planar shape; and wherein the first end and the second end each comprises a curved end.

20. The method of claim 18 wherein the animal collar device comprises a second coil antenna carried by the circuit board and to be coupled to the processor; wherein the second coil antenna comprises an elongate coil segment, and a feed arm coupled between the elongate coil segment and the processor; wherein the second coil antenna comprises a mount comprising a retention arm coupled to the circuit board, and an inner antenna arm extending from the retention arm and within the elongate coil segment; and wherein the mount comprises an outer arm extending from the retention arm and radially around the elongate coil segment.

* * * * *